(12) United States Patent
Wang et al.

(10) Patent No.: US 11,412,074 B2
(45) Date of Patent: Aug. 9, 2022

(54) METHOD AND DEVICE FOR TRANSPARENTLY TRANSMITTING SERVICE FREQUENCY

(71) Applicant: HUAWEI TECHNOLOGIES CO., LTD., Shenzhen (CN)

(72) Inventors: Renlei Wang, Shenzhen (CN); Xiaojun Zhang, Shenzhen (CN); Xingyao Chen, Shenzhen (CN); Shuai Xiao, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 89 days.

(21) Appl. No.: 16/786,507

(22) Filed: Feb. 10, 2020

(65) Prior Publication Data

US 2020/0195760 A1 Jun. 18, 2020

Related U.S. Application Data

(63) Continuation of application No. PCT/CN2018/098143, filed on Aug. 1, 2018.

(30) Foreign Application Priority Data

Aug. 11, 2017 (CN) .......................... 201710687136.8

(51) Int. Cl.
*H04L 69/22* (2022.01)
*H04J 3/16* (2006.01)
*H04L 7/027* (2006.01)

(52) U.S. Cl.
CPC .......... *H04L 69/22* (2013.01); *H04L 2212/00* (2013.01)

(58) Field of Classification Search
None
See application file for complete search history.

(56) References Cited

U.S. PATENT DOCUMENTS 10,623,327 B2 * 4/2020 Wu ................. H04L 1/0008
2003/0133446 A1 * 7/2003 Schoenblum ....... H04L 65/1036
370/356

(Continued)

FOREIGN PATENT DOCUMENTS

CN 106411454 A 2/2017
CN 106612203 A 5/2017

(Continued)

OTHER PUBLICATIONS

IEEE P802.3bs™/D3.0 Draft Standard for Ethernet Amendment: Media Access Control Parameters, Physical Layers and Management Parameters for 200 Gb/s and 400 Gb/s Operation, Jan. 10, 2017, total 387 pages.

*Primary Examiner* — Jay L Vogel
(74) *Attorney, Agent, or Firm* — Womble Bond Dickinson (US) LLP

(57) ABSTRACT

This application provides a method and device for transparently transmitting a service frequency, where the method includes: determining, by a first device, first service frequency information Xn, where the first service frequency information Xn is used to indicate an amount of n-bit first service data that is sent by the first device within first statistical duration, and a sending frequency of the first device is used as a reference for the first statistical duration; and encapsulating, by the first device, the first service frequency information Xn into a first S/T bit code block, inserting the first S/T bit code block into a data stream of the first service data, and sending the data stream of the first service data to a second device.

18 Claims, 17 Drawing Sheets

(56) References Cited

U.S. PATENT DOCUMENTS

| | | | |
|---|---|---|---|
| 2009/0190595 A1* | 7/2009 | Jiang | H04L 25/4908 370/395.1 |
| 2010/0091794 A1* | 4/2010 | Jiang | H04J 3/1652 370/468 |
| 2013/0195233 A1* | 8/2013 | Amichai | G09G 5/008 375/354 |
| 2014/0006549 A1* | 1/2014 | Narayanaswamy | H04L 45/38 709/217 |
| 2017/0005742 A1 | 1/2017 | Gareau et al. | |
| 2017/0005949 A1* | 1/2017 | Gareau | H04L 12/413 |
| 2018/0159785 A1* | 6/2018 | Wu | H04L 1/0008 |
| 2018/0183538 A1 | 6/2018 | Chen et al. | |
| 2020/0014990 A1* | 1/2020 | Tochio | H04Q 11/0003 |

FOREIGN PATENT DOCUMENTS

| | | | | |
|---|---|---|---|---|
| CN | 106612220 A | 5/2017 | | |
| CN | 106788855 A | 5/2017 | | |
| CN | 106803814 A | 6/2017 | | |
| JP | 2001197031 A | 7/2001 | | |
| JP | 2008078940 A | 4/2008 | | |
| WO | 2016115927 A1 | 7/2016 | | |
| WO | 2016142134 A1 | 9/2016 | | |
| WO | 2017016379 A1 | 2/2017 | | |
| WO | WO-2017016379 A1 * | 2/2017 | | H04L 1/00 |

* cited by examiner

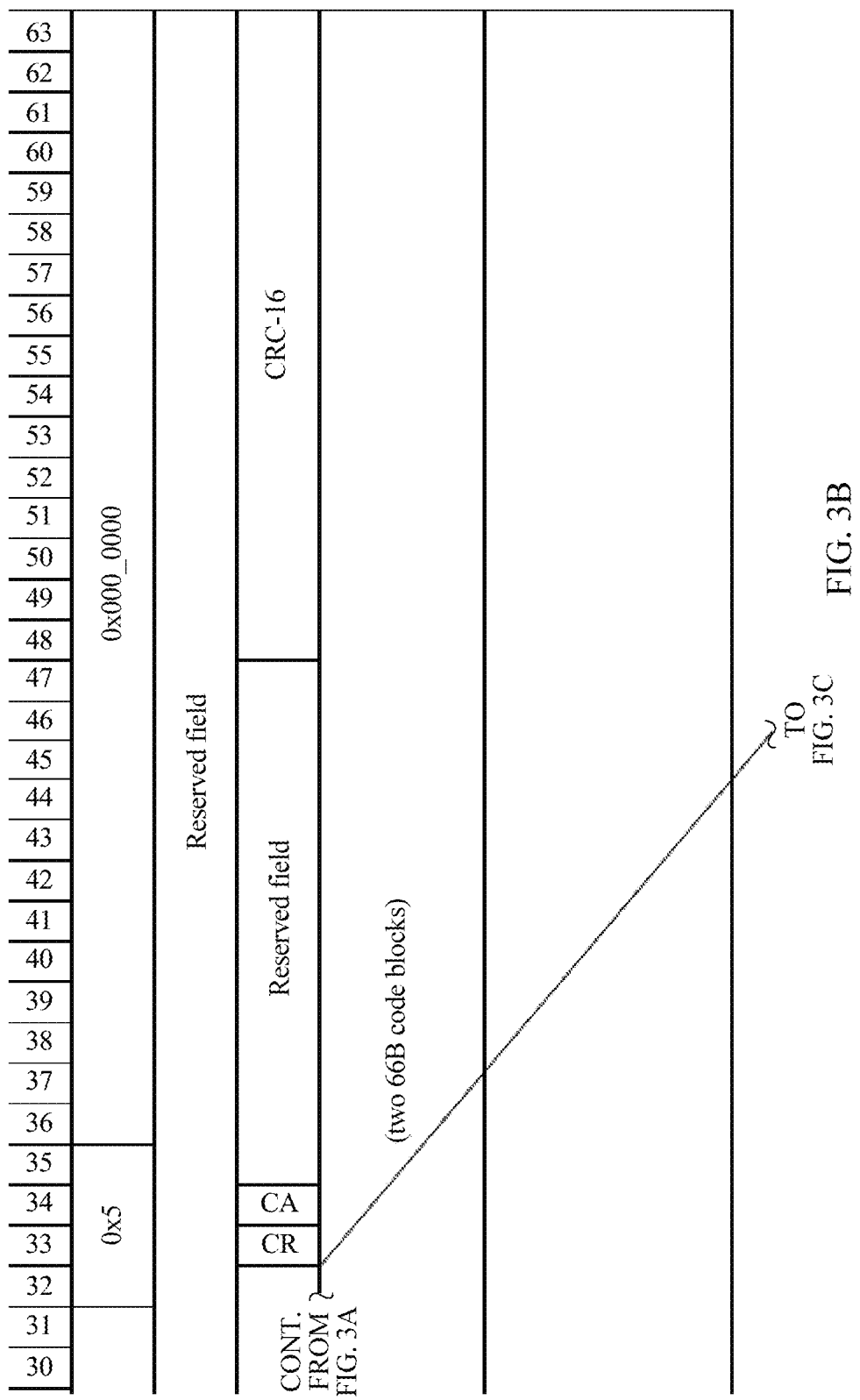

METHOD AND DEVICE FOR TRANSPARENTLY TRANSMITTING SERVICE FREQUENCY

CROSS-REFERENCE TO RELATED APPLICATIONS

This application is a continuation of International Application No. PCT/CN2018/098143, filed on Aug. 1, 2018, which claims priority to Chinese Patent Application No. 201710687136.8, filed on Aug. 11, 2017, The disclosures of the aforementioned applications are hereby incorporated by reference in their entireties.

TECHNICAL FIELD

This application relates to the transport network field, and more specifically, to a method and device for transparently transmitting a service frequency.

BACKGROUND

An Optical Internetworking Forum (OIF) proposes a concept of a flexible Ethernet (FlexE) in a technical proposal released in April 2016, and the FlexE is more widely applied. A FlexE-based bearer network receives various types of services in an application. Some of these services have a requirement for transparently transmitting a frequency, for example, a constant bit rate (CBR) service such as a common public radio interface (CPRI) service and a synchronous digital hierarchy (SDH) service. Currently, the FlexE does not support transparent transmission of a service frequency. Particularly, when a plurality of services has the requirement for transparently transmitting a frequency, and frequencies of these services have different sources, an existing device is hard to implement transparent transmission of a service frequency.

SUMMARY

This application provides a method and device for transparently transmitting a service frequency, to support a plurality of pieces of service data with a requirement for transparently transmitting a service frequency in simultaneously accessing a link in a FlexE without changing an existing FlexE standard.

According to a first aspect, a method for transparently transmitting a service frequency is provided, including: determining, by a first device, first service frequency information Xn, where the first service frequency information Xn is used to indicate an amount of n-bit first service data that is sent by the first device within first statistical duration, a sending frequency of the first device is used as a reference for the first statistical duration, and n is a positive integer; and encapsulating, by the first device, the first service frequency information Xn into a first S/T bit code block, inserting the first S/T bit code block into a data stream of the first service data, and sending the data stream of the first service data to a second device, where S and T are positive integers.

The method for transparently transmitting a service frequency in the first aspect can support a plurality of pieces of service data with a requirement for transparently transmitting a service frequency in simultaneously accessing a link in a FlexE without changing an existing FlexE standard. Because a stuff code block is inserted into a data stream of each service with the requirement for transparently transmitting a service frequency to perform rate matching in the FlexE, inserting the first service frequency information into the data stream of the first service data and properly using bandwidth allocated to the service according to the method in the first aspect does not affect another service.

It should be understood that the n-bit first service data is a unit used to collect statistics about the first service data.

It should be further understood that the first statistical duration may be determined based on a rate of the first service data. If the rate of the first service data is lower than a specific threshold, relatively long first statistical duration may be determined, for example, the first statistical duration is longer than a length of a basic frame or a multiframe. If the rate of the first service data is higher than a specific threshold, relatively short first statistical duration may be determined, for example, the first statistical duration is shorter than a length of a basic frame or a multiframe.

It should be further understood that an S/T bit code block may be a 64/66B code block, an 8/10B code block, or the like.

In one embodiment, the first S/T bit code block is an S/T bit code block identified by O code. In one embodiment, the code block in which the first service frequency information Xn is encapsulated is marked by a special identifier, so that a lower-level device can identify and parse the S/T bit code block.

It should be understood that the O code is O code, and a type field of the O code may be 0x4B. Currently, 0x0 and 0xF are used for O code that has been standardized in 802.3. Currently, O code of a FlexE overhead code block 1 defined in OIF FlexE implementation agreement (IA) 1.0 is 0x5.

In one embodiment, first statistical duration information is further encapsulated in the first S/T bit code block, and the first statistical duration information is used to indicate the first statistical duration.

In one embodiment, the first statistical duration is a first target quantity of transmit clock cycles, and the first statistical duration information includes the first target quantity. In one embodiment, when the service frequency information is calculated, statistical duration is periodically decoupled from the basic frame and the multiframe, and optimal statistical duration may be accordingly selected based on the service rate, so that the service frequency information obtained through statistics collection is more accurate.

In one embodiment, the method further includes: determining, by the first device, the first statistical duration based on a rate of the first service data; and the determining, by a first device, first service frequency information Xn includes: collecting, by the first device, statistics about the amount of n-bit first service data that is sent within the first statistical duration. In one embodiment, the first device serves as an access node.

In one embodiment, the method further includes: receiving, by the first device, the data stream of the first service data, where the data stream of the first service data is sent by a third device, and parsing out first service frequency information Yn from a second S/T bit code block of the data stream of the first service data; and the determining, by a first device, first service frequency information Xn includes: calculating, by the first device based on the first service frequency information Yn, the amount of n-bit first service data that is sent within the first statistical duration, to obtain the first service frequency information Xn. In one embodiment, the first device serves as an intermediate node, so that this embodiment can support a multi-hop cascading networking mode.

In one embodiment, the first statistical duration information is further encapsulated in the second S/T bit code block, and the first statistical duration information is used to indicate the first statistical duration.

In one embodiment, the method further includes: determining, by the first device, second service frequency information Wm, where the second service frequency information Wm is used to indicate an amount of m-bit second service data that is sent by the first device within second statistical duration, the sending frequency of the first device is used as a reference for the second statistical duration, and m is a positive integer; and encapsulating, by the first device, the second service frequency information Wm into a third S/T bit code block, inserting the third S/T bit code block into a data stream of the second service data, and sending the data stream of the second service data to the second device. The method in this embodiment can support a plurality of pieces of service data with a requirement for transparently transmitting a service frequency in simultaneously accessing a device.

In one embodiment, the first service frequency information $Xn=AgF_{client}/F_{FlexE}$, A is a frequency coefficient, $F_{client}$ is a service frequency of the first service data, and $F_{FlexE}$ is the sending frequency of the first device.

According to a second aspect, a method for transparently transmitting a service frequency is provided, including: receiving, by a fourth device, a data stream of first service data, where the data stream of the first service data is sent by a fifth device, the data stream of the first service data includes a first S/T bit code block, the first S/T bit code block includes first service frequency information Zn, the first service frequency information Zn is used to indicate an amount of n-bit first service data that is sent by the fifth device within first statistical duration, a sending frequency of the fifth device is used as a reference for the first statistical duration, and n, S, and T are positive integers; and recovering, by the fourth device based on the first service frequency information Zn, a clock corresponding to the first service data.

The method for transparently transmitting a service frequency in the second aspect can support a plurality of pieces of service data with a requirement for transparently transmitting a service frequency in simultaneously accessing a link in a FlexE without changing an existing FlexE standard. Because a stuff code block is inserted into a data stream of each service with the requirement for transparently transmitting a service frequency to perform rate matching in the FlexE, inserting the first service frequency information into the data stream of the first service data and properly using bandwidth allocated to the service according to the method in the second aspect does not affect another service.

In one embodiment, the first S/T bit code block is an S/T bit code block identified by O code.

In one embodiment, first statistical duration information is further encapsulated in the first S/T bit code block, and the first statistical duration information is used to indicate the first statistical duration; and the recovering, by the fourth device based on the first service frequency information Zn, a clock corresponding to the first service data includes: recovering, by the fourth device based on the first service frequency information Zn and the first statistical duration information, the clock corresponding to the first service data.

In one embodiment, the first statistical duration is a first target quantity of transmit clock cycles, and the first statistical duration information includes the first target quantity.

In one embodiment, the method further includes: receiving, by the fourth device, a data stream of second service data, where the data stream of the second service data is sent by the fifth device, the data stream of the second service data includes a second S/T bit code block, the second S/T bit code block includes second service frequency information Vm, the second service frequency information Vm is used to indicate an amount of n-bit second service data that is sent by the fifth device within second statistical duration, the sending frequency of the fifth device is used as a reference for the second statistical duration, and m is a positive integer; and recovering, by the fourth device based on the second service frequency information Vm, a clock corresponding to the second service data.

In one embodiment, the first service frequency information $Zn=AgF_{client}/F_{FlexE}$, A is a frequency coefficient, $F_{client}$ is a service frequency of the first service data, and $F_{FlexE}$ is the sending frequency of the fifth device.

According to a third aspect, a device for transparently transmitting a service frequency is provided. The device is a first device, and is configured to perform the method according to any one of the first aspect or the embodiments of the first aspect. Specifically, the device for transparently transmitting a service frequency may include units configured to perform the method according to any one of the first aspect or the embodiments of the first aspect.

According to a fourth aspect, a device for transparently transmitting a service frequency is provided. The device is a fourth device, and is configured to perform the method according to any one of the second aspect or the embodiments of the second aspect. Specifically, the device for transparently transmitting a service frequency may include units configured to perform the method according to any one of the second aspect or the embodiments of the second aspect.

According to a fifth aspect, a device for transparently transmitting a service frequency is provided. The device for transparently transmitting a service frequency is a first device. The device for transparently transmitting a service frequency includes a processor, a memory, and a network interface. The memory is configured to store an instruction. The processor and the network interface are configured to execute the instruction stored in the memory. When the instruction stored in the memory is executed, the processor and the network interface perform the method according to any one of the first aspect or the embodiments of the first aspect.

According to a sixth aspect, a device for transparently transmitting a service frequency is provided. The device for transparently transmitting a service frequency is a fourth device. The device for transparently transmitting a service frequency includes a processor, a memory, and a network interface. The memory is configured to store an instruction. The processor and the network interface are configured to execute the instruction stored in the memory. When the instruction stored in the memory is executed, the processor and the network interface perform the method according to any one of the second aspect or the embodiments of the second aspect.

According to a seventh aspect, a computer storage medium is provided. The computer storage medium stores an instruction, and when the instruction runs on a computer, the computer is enabled to perform the method according to any one of the first aspect or the embodiments of the first aspect.

According to an eighth aspect, a computer storage medium is provided. The computer storage medium stores an instruction, and when the instruction runs on a computer, the computer is enabled to perform the method according to any one of the second aspect or the embodiments of the second aspect.

According to a ninth aspect, a computer program product that includes an instruction is provided. When the instruction in the computer program product runs on a computer, the computer is enabled to perform the method according to any one of the first aspect or the embodiments of the first aspect.

According to a tenth aspect, a computer program product that includes an instruction is provided. When the instruction in the computer program product runs on a computer, the computer is enabled to perform the method according to any one of the second aspect or the embodiments of the second aspect.

Effects that can be obtained according to the second aspect to the tenth aspect correspond to the effects that can be obtained according to the first aspect. Details are not described herein again.

BRIEF DESCRIPTION OF DRAWINGS

FIG. 3A, FIG. 3B, and FIG. 3C are a schematic diagram of an overhead code block in a FlexE basic frame according to an embodiment of this application;

DESCRIPTION OF EMBODIMENTS

Figure 1:
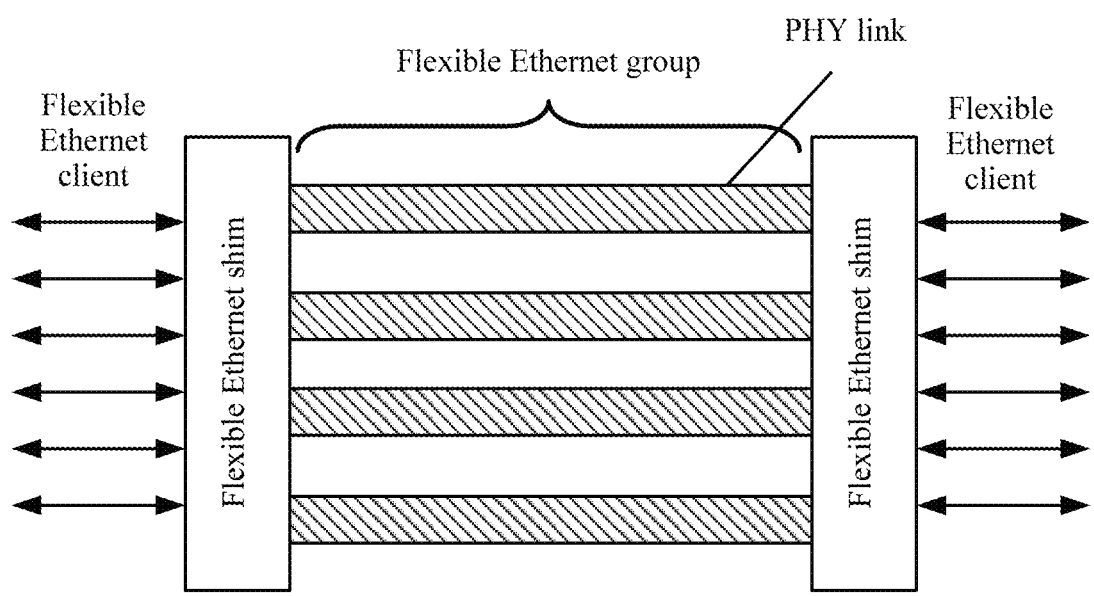
FIG. 1 is a schematic diagram of a FlexE architecture according to an embodiment of this application.

The following describes the technical solutions in this application with reference to the accompanying drawings.

It should be understood that the technical solutions in the embodiments of this application may be applied to a network such as a FlexE or another network based on an Ethernet technology or a flexible optical transport network (FlexO). This is not limited in the embodiments of this application. The following performs description by using the FlexE as an example.

It should be understood that a physical connection link in the embodiments of this application may be briefly referred to as a "link", and a link in the FlexE may also be referred to as a "physical layer (PHY) link".

The following briefly describes the concepts involved in this specification.

FlexE Technology:

An 802.3 protocol-based Ethernet defined by the Institute of Electrical and Electronics Engineers (IEEE) is widely used and rapidly developed over a considerable period of time in the past. In the Ethernet, an Ethernet port usually appears as a logical data-oriented concept and is referred to as a logical port or is briefly referred to as a port, and an Ethernet physical interface appears as a hardware concept and is referred to as a physical interface or is briefly referred to as an interface. Generally, the Ethernet port is marked by a Media Access Control (MAC) address. A rate of a conventional Ethernet port is determined based on a rate of an Ethernet physical interface. Generally, maximum bandwidth of an Ethernet port corresponds to bandwidth of an Ethernet physical interface.

In recent years, a rate of an Ethernet interface is increased by 10 times and continuously evolves and develops from 10 Mbps to 100 Mbps, 1000 Mbps (1 Gbps), 10 Gbps, 40 Gbps, 100 Gbps, and 400 Gbps. However, with development of technologies, a difference between requirements of various scenarios for bandwidth granularity is greater. Consequently, a relatively large deviation between an existing Ethernet and an actual application requirement expectation appears. Specifically, an increase of bandwidth required by a mainstream application does not show such as a 10-times increase feature, for example, the bandwidth required by the mainstream application includes 50 Gbps, 75 Gbps, 200 Gbps, and the like. If 50 Gbps is transmitted over a 100GE, resources are wasted. Currently, there is no corresponding Ethernet standard granularity to carry 200 Gbps. Therefore, in the industry, it is expected that support for an Ethernet port (a virtual connection) with a bandwidth of 50 Gbps, 60 Gbps, 75 Gbps, 200 Gbps, 150 Gbps, or the like is provided.

In the industry, it is expected that some Ethernet ports with flexible bandwidth can be provided. These Ethernet ports may share one or more Ethernet physical interfaces. For example, two 40GE ports and two 10GE ports share one 100G physical interface. For another example, the Ethernet port can flexibly adjust a rate as a requirement varies, for example, adjust the rate from 200 Gbps to 330 Gbps or from 50 Gbps to 20 Gbps, to improve usage efficiency of the Ethernet port or prolong a usage life cycle of the Ethernet port. Fixed-rate physical links may be cascaded and bundled to support a stack-based increase of a logical port rate (for example, two 100GE physical interfaces are stacked, cascaded, and bundled to support a 200GE logical port). In addition, bandwidth obtained by flexibly stacking physical interfaces can be used as a resource pool, and bandwidth in the resource pool is allocated to a particular Ethernet logical port based on a granularity (for example, 5G is one granularity), so that several Ethernet virtual connections can efficiently share a physical link group obtained through stacking and cascading.

An OIF proposes a concept of a FlexE in a flexible Ethernet implementation agreement released in April 2016. Specifically, in the FlexE, a flexible Ethernet group (FlexE Group) is established by using several Ethernet PHY links, and a universal mechanism that supports different Ethernet MAC rates is provided, to support functions such as binding, a subrate, and channelization of an Ethernet service.

A MAC rate provided by the FlexE may be greater than a rate of a single PHY link (which is implemented through binding), or may be less than a rate of a single PHY link (which is implemented through a subrate and channelization). For example, in a binding scenario of the Ethernet service, a 200G Ethernet service (MAC code stream) can be transmitted by using two existing 100GE physical medium dependent sublayers (PMD). In a subrate application scenario of the Ethernet service, a 50G Ethernet service can be transmitted by using one existing 100GE PMD. In addition, in a channelization scenario of the Ethernet service, several logical ports can share one or more physical interfaces, and one 150G Ethernet service and two 25G Ethernet services can be transmitted by using two existing 100GE PMDs.

A schematic diagram of a specific architecture of an existing FlexE may be shown in FIG. 1. The FlexE is a group bound with K PHY links, and a value of K is a positive integer. A FlexE group shown in FIG. 1 includes four PHY links. In the current flexible Ethernet implementation agreement, only a 100G PHY link is supported. After the IEEE P802.3bs improves a 400GE standard in the future, the FlexE can support a 400G PHY link. A flexible Ethernet client (FlexE Client) is a MAC-based Ethernet data stream, and a rate of the flexible Ethernet client may be the same as or different from a rate of an existing Ethernet PHY link, for example, 10 Gb/s, 40 Gb/s, or 25 Gb/s. The client may be referred to as a client, or may be referred to as a client side, or may be referred to as a service. A flexible Ethernet shim (FlexE Shim) is used to map data of the FlexE client to the FlexE group, and demap data of the FlexE group to a logical layer of the FlexE client. Similar to a multi-link gearbox (MLG) technology, the FlexE shim performs a multiplexing function in a sending direction, and maps the data from the FlexE client to the FlexE group. In addition, the FlexE shim performs a de-multiplexing function in a receiving direction, and demaps the data from the FlexE group to the FlexE client.

Figure 2A:
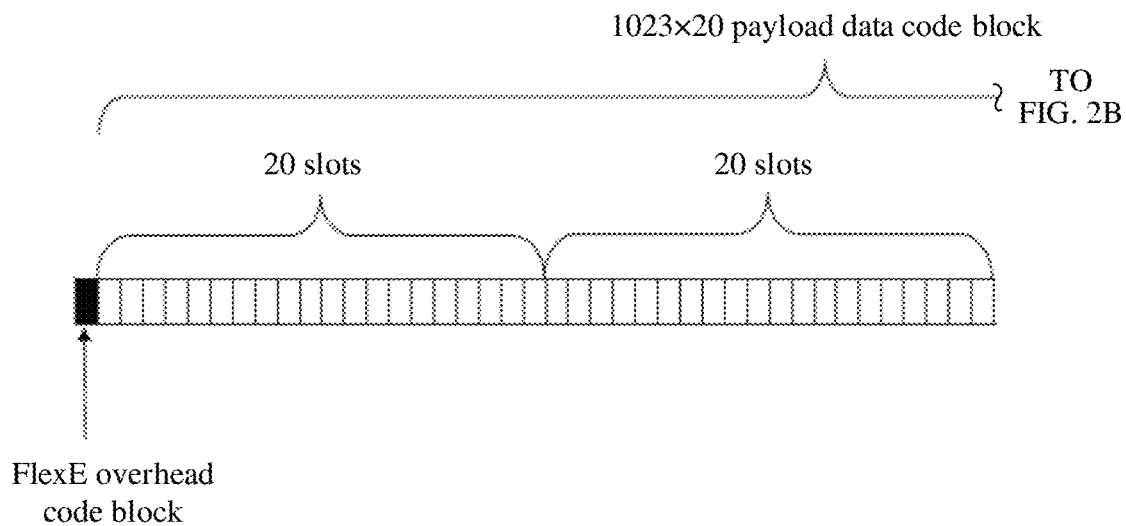
FIG. 2A and FIG. 2B are a schematic diagram of a code block on a PHY link according to an embodiment of this application.
Figure 2B:
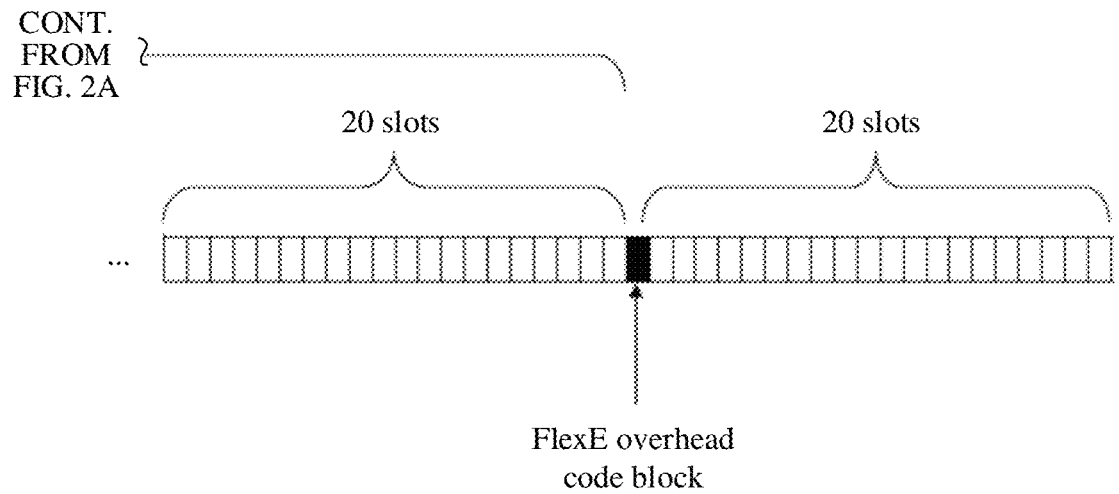

In the FlexE, with reference to a synchronous digital hierarchy (SDH)/optical transport network (OTN) technology, a fixed frame format is constructed for physical interface transmission, and slot division is performed for time division multiplexing (TDM). FIG. 2A and FIG. 2B are a schematic diagram of a code block on a PHY link according to an embodiment of this application. Different from that in an SDH/OTN, a slot division granularity for TDM in the FlexE is 66 bits, and may exactly correspondingly carry a 64B/66B code block. Data on each PHY link in the FlexE is aligned by periodically inserting a FlexE overhead (OH) code block. Specifically, one 66B FlexE overhead code block is inserted every 1023×20 66B data code blocks, as shown in FIG. 2A and FIG. 2B. Corresponding to a scenario of a 100G PHY link, a time interval between adjacent FlexE overhead code blocks is 13.1 microseconds.

In a FlexE 1.0 standard, it is stipulated that 64/66B encoding is performed on a FlexE client to obtain a code block stream, rate matching is performed through idle code block insertion/deletion (Idle Insert/Delete) to obtain a code block stream of a flexible Ethernet service, and code blocks in the code block stream of the flexible Ethernet service are placed, one by one, in slots allocated to the flexible Ethernet service. An idle code block may also be referred to as a stuff code block.

A FlexE frame is classified into a basic frame and a multiframe. One FlexE basic frame includes eight lines, a FlexE overhead code block is located at a first 66B block location of each line, and the overhead code block is followed by a payload area (1023×20 66B payload data code blocks) for slot division. A 100GE is used as an example. Bandwidth of a 100GE interface is divided into 20 slots, and bandwidth of each slot is approximately 5 Gbps. 32 basic frames constitute one multiframe.

Figure 3A:
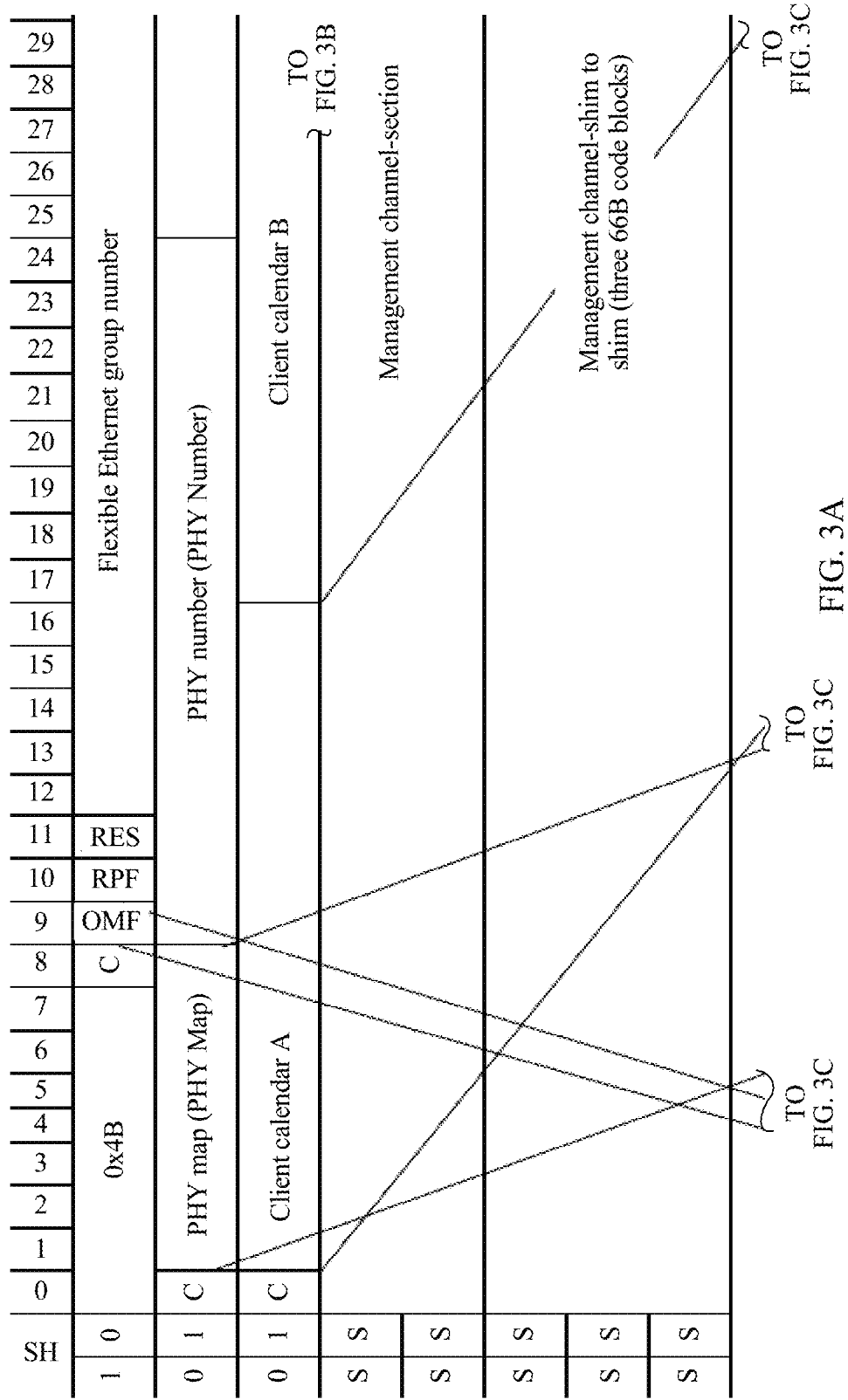
Figure 3C:
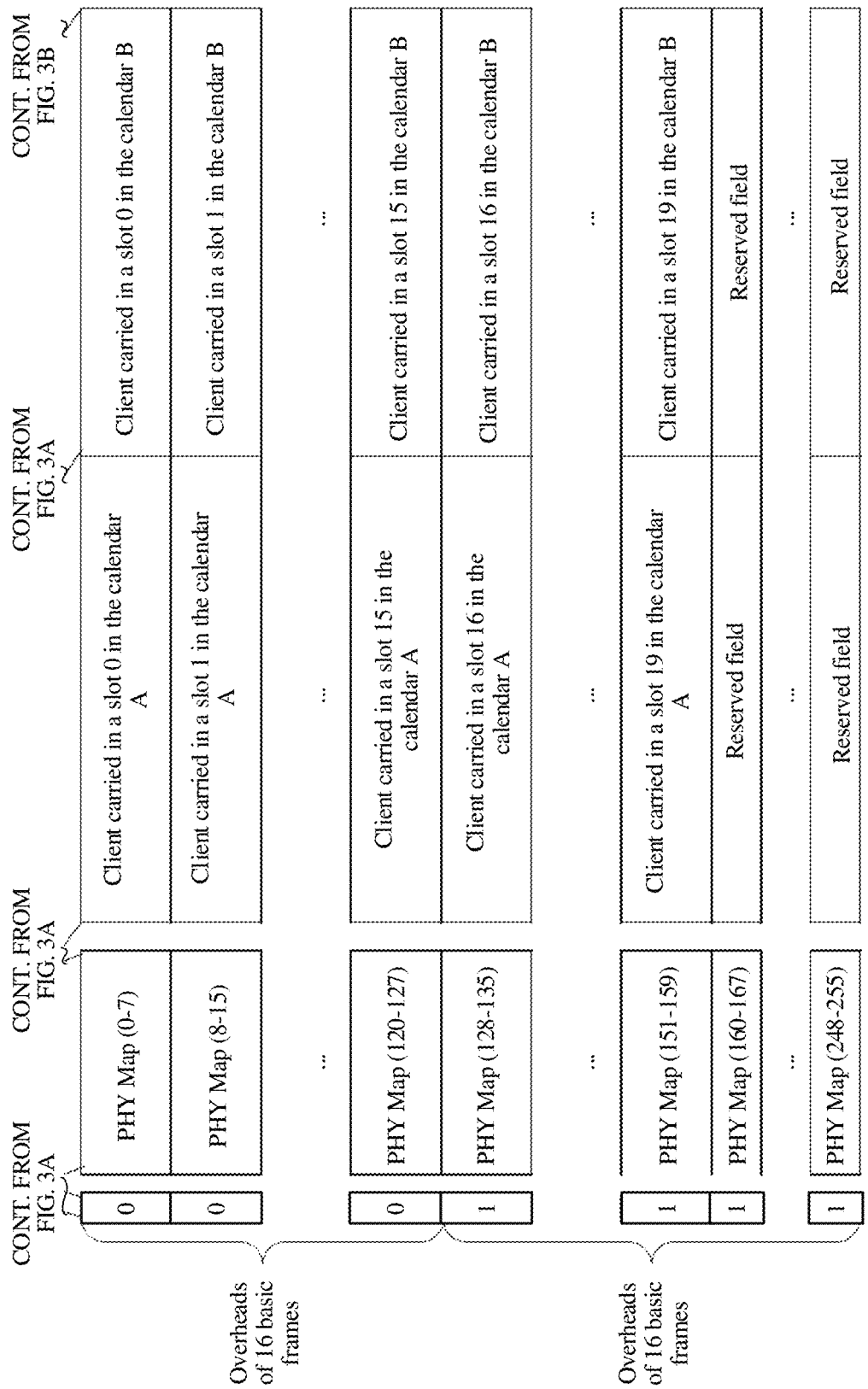

FIG. 3A, FIG. 3B, and FIG. 3C are a schematic diagram of an overhead code block in a FlexE basic frame according to an embodiment of this application. A first code block in a FlexE basic frame uses a "0x4B" or "0x5" field as a tag field, to identify the code block as an overhead code block. After recognizing the overhead code block and receiving 1023×20 64/66B code blocks, a receive end device may receive a next overhead code block, and by analogy, the entire FlexE basic frame may be extracted from a code block stream. It can be learned from FIG. 3A, FIG. 3B, and FIG. 3C that the overhead code block includes some fields used for specific indication. For example, a FlexE overhead code block transmitted on each link includes fields such as a flexible Ethernet group number (FlexE Group Number), a physical link map (PHY Map), a physical link number (PHY Number), a calendar A, and a calendar B. The FlexE group number is used to indicate a number of a flexible Ethernet group in which the link is located. The PHY map (8×32=256 bits are needed in total to indicate the PHY map in one FlexE multiframe) is used to indicate distribution of PHYs included in the flexible Ethernet group in which the link is located, to be specific, the PHY map is used to control which PHY links are members of the group (control of which PHYs are members of this group). The physical link number may be from 1 to 254. The calendar A and the calendar B are respectively used to indicate a current calendar configuration and a standby calendar configuration of the FlexE group. In a third code block of each FlexE basic frame, 16 bits are used to indicate a number of service data transmitted in a slot. A first FlexE frame in each FlexE multiframe carries a number of service data transmitted in a corresponding slot 0. By analogy, a twentieth FlexE basic frame in the FlexE multiframe carries a number of service data transmitted in a corresponding slot 19. After receiving information about FlexE basic frames on all links in the FlexE group, the receive end device may obtain a slot allocation manner of service data in the FlexE group.

In addition, a field C is used to indicate a calendar in use. An OMF is an overhead multiframe indicator. An RPF is a remote PHY fault. Res and Reserved are reserved fields. The PHY number is an identifier of the PHY in the FlexE group. A CR is a calendar switch request. A CA is a calendar switch acknowledgement, and ss is valid synchronization header bits, including 2 bits, where the 2 bits may be 01 or 10. A CRC is a cyclic redundancy check bit. It can be learned from FIG. 3A, FIG. 3B, and FIG. 3C that there are still some reserved fields in a current overhead code block. In addition, five 66B code blocks are used as management channels, to transmit information other than data payload between two FlexE devices.

Figure 4:
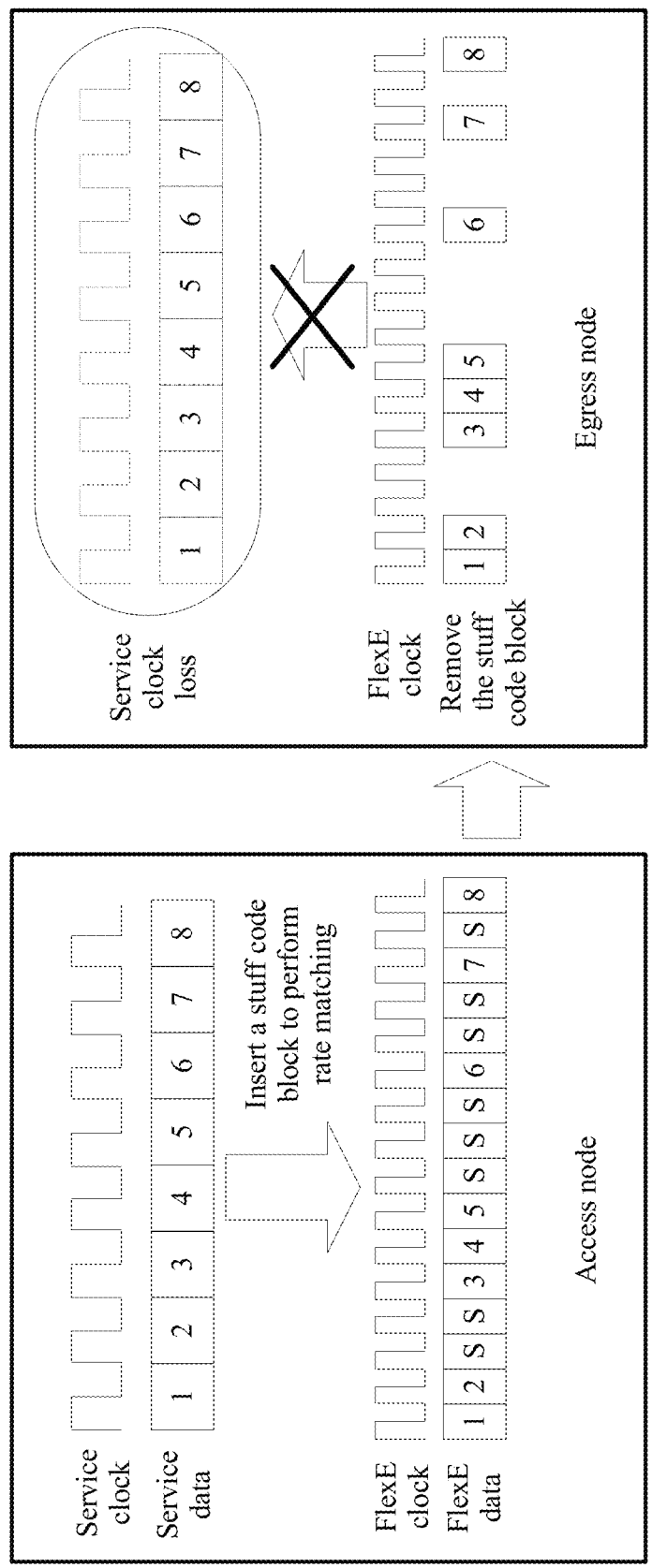
FIG. 4 is a schematic diagram of a service clock loss in a process of transmitting service data in a FlexE.

Service Frequency and Service Clock:

FIG. 4 is a schematic diagram of a service clock loss in a process of transmitting service data in a FlexE. A service requiring that a service frequency is transparently transmitted is usually a CBR service, for example, a CPRI service, and an SDH service. As shown in FIG. 4, in a process of transmitting service data of the CBR service (a code block 1 to a code block 8 of the service data shown in FIG. 4) in respective networks, to ensure a constant bit rate, the service data of the CBR service is usually transmitted together with a service clock. A time between a rising edge and a next rising edge of the service clock is referred to as a clock cycle, and a quantity of clock cycles per second is referred to as a clock frequency.

At an access node, the service data of the CBR service is mapped, to several slots of the FlexE for transmission, from an original network in which the CBR service is transmitted. Generally, bandwidth of slots allocated by the FlexE to the CBR service is greater than bandwidth of the CBR service. Therefore, mapping the service data to the FlexE is asynchronous mapping. In a currently used method, a stuff code block (a code block S shown in FIG. 4) is inserted into a code block stream of the service data, to form a code block stream of FlexE data, so as to implement rate matching between service bandwidth and transmission slot bandwidth of the FlexE. The code block stream of the FlexE data is transmitted together with a FlexE clock in the FlexE. When the code block stream of the FlexE data is transmitted to an egress node, the egress node removes the stuff code block in the code block stream of the FlexE data. However, the service clock of the service data is lost. Because the service clock and the FlexE clock have different sources, the service clock cannot be recovered. In other words, the FlexE does not support transparent transmission of a service frequency. For the service requiring that a service frequency is transparently transmitted, a service clock loss or a service frequency loss is unacceptable.

Figure 5:
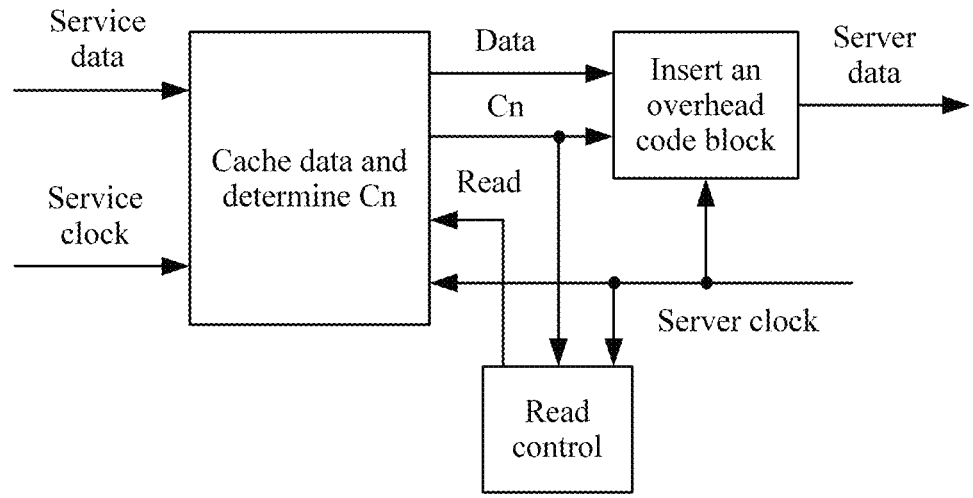
FIG. 5 is a schematic diagram of a circuit that is used to map service data in an OTN.

Technology for transparently transmitting a service frequency in an optical transport network (OTN):

In the OTN, a service frequency is transparently transmitted in a manner in which a quantity of n-bit services carried in a single server frame or a server multiframe is transmitted by using OTN overheads (number of client n-bit data entities per server frame or server multiframe, Cn). FIG. 5 is a schematic diagram of a circuit that is used to map service data in an OTN. In other words, FIG. 5 is a schematic diagram of a processing circuit of an access node of a CBR service. The access node receives service data (client data) and a service clock (client clock), and caches the service data and determines Cn (buffer and determine Cn). Specifically, a read control reads a server clock and the service clock (client clock), and determines the Cn based on the server clock and the service clock. The access node of the CBR service calculates the Cn based on the service clock (corresponding to a service frequency, namely, a receiving frequency of the access node) and the server clock (corresponding to a server frequency, namely, a sending frequency of the access node), and inserts the Cn into an overhead code block of a link, to form server data for transmission.

Figure 6:
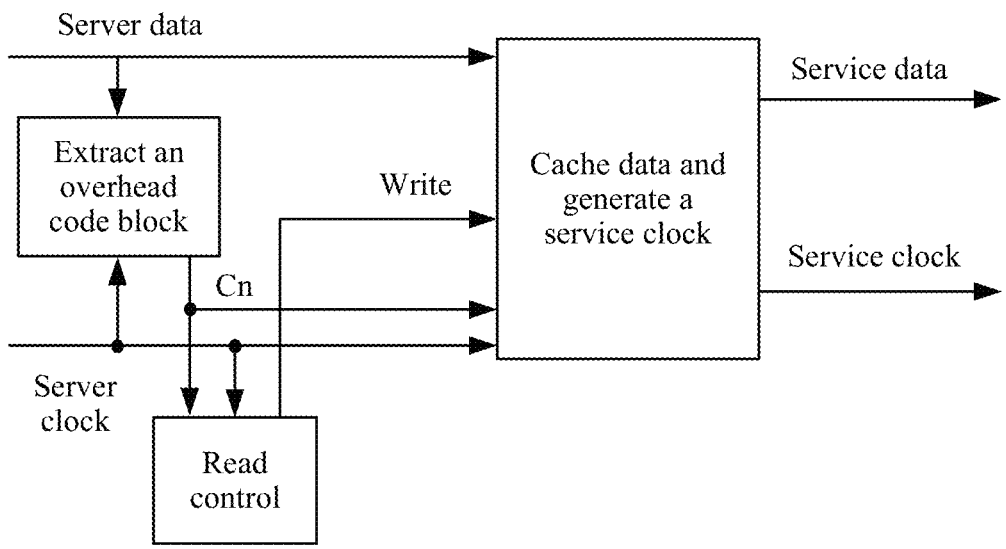
FIG. 6 is a schematic diagram of a circuit that is used to demap service data in an OTN.

FIG. 6 is a schematic diagram of a circuit that is used to demap service data in an OTN. In other words, FIG. 6 is a schematic diagram of a processing circuit of an egress node of a CBR service. The egress node receives server data and a server clock, caches the server data, and generates a service clock (client clock). Specifically, a read control reads the server clock and Cn, and generates the service clock (client clock) based on the server clock and the Cn. The egress node of the CBR service recovers the service clock (corresponding to a service frequency, namely, a sending frequency of the egress node) based on the server clock (corresponding to a server frequency, namely, a receiving frequency of the egress node) and the Cn.

For a FlexE, similarly, Cn is calculated and the Cn is inserted into an overhead code block of a PHY link for transmission, a FlexE standard needs to be changed, and use of fields in the overhead code block of the FlexE is replanned. In addition, when the Cn is transmitted in the overhead code block, the Cn needs to be calculated by using a basic frame period or a multiframe period of the PHY link as a statistical period. Consequently, the statistical period of the Cn is closely related to the basic frame period or the multiframe period of the PHY link. However, the FlexE carries various types of services. For different service rates, if the Cn is calculated by using a same statistical period, accuracy of the Cn is relatively poor. For example, for a service with a relatively low rate, if the statistical period is relatively short, a large error is caused. In addition, the FlexE is based on an Ethernet kernel, and a basic frame structure or a multiframe structure defined in the FlexE is periodic. In a physical coding sublayer (PCS), insertion of an alignment marker (AM) causes a periodic jitter of the overhead code block of the FlexE. The periodic jitter of the overhead code block directly affects accuracy of Cn calculation, and quality of the service clock that is recovered by the egress node of the CBR service based on the Cn becomes poor.

The schematic diagram shown in FIG. 4 is for a single-hop networking mode. To be specific, two devices: an access node and an egress node are directly physically connected by using a communications cable, and there is no other device between the two devices, in other words, there is no intermediate node between the two devices. In the technology for transparently transmitting a service frequency in the OTN shown in FIG. 5 and FIG. 6, only a single-hop networking mode is considered, and a problem of transparently transmitting a frequency in a multi-hop cascading networking mode cannot be resolved. In the multi-hop cascading networking mode, there is another intermediate node between an access node and an egress node. In the FlexE, both the single-hop networking mode and the multi-hop cascading networking modes exist. For the multi-hop cascading networking mode, in a process of transmitting FlexE data, although each level of device has a same nominal frequency, a specific difference exists in actual frequencies. If the technology in FIG. 5 and FIG. 6 is still used, because the Cn is calculated based on the frequencies of the access node, if the Cn is directly transparently transmitted, quality of the recovered service clock is poor.

Figure 7:
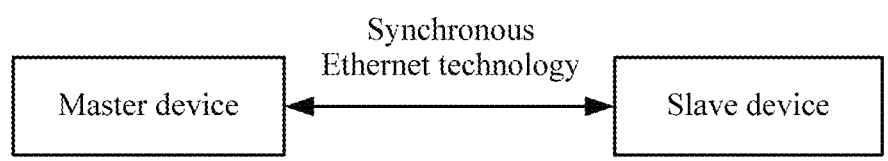
FIG. 7 is a schematic diagram of a synchronous Ethernet technology in a FlexE.

Technology for Transparently Transmitting a Service Frequency in a FlexE:

FIG. 7 is a schematic diagram of a synchronous Ethernet technology in a FlexE. In the FlexE, two adjacent devices are connected by using a single-hop physical interface and a PHY link, a master and slave relationship between the two devices may be determined by using the synchronous Ethernet technology, and synchronization between slave device frequency and master device frequency is implemented.

Figure 8:
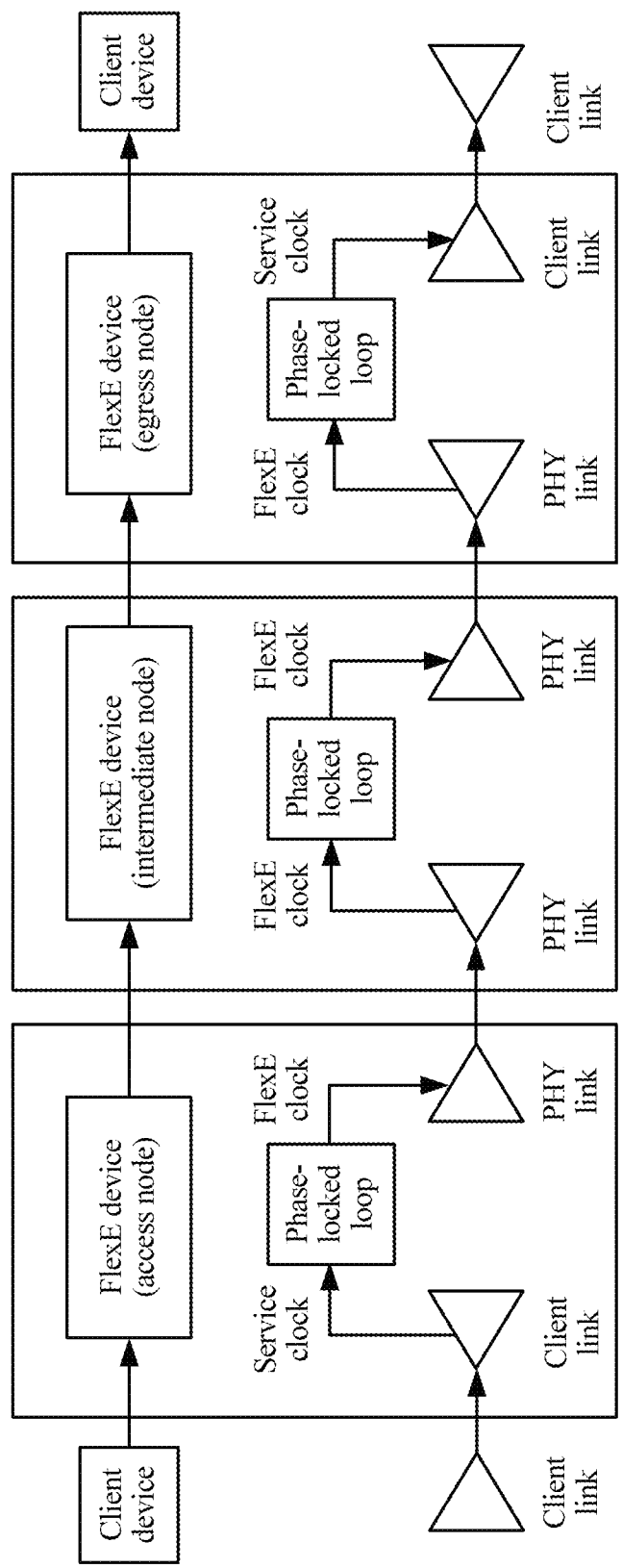
FIG. 8 is a schematic diagram of transparently transmitting a service frequency by using a synchronous Ethernet technology in a FlexE.

FIG. 8 is a schematic diagram of transparently transmitting a service frequency by using a synchronous Ethernet technology in a FlexE. Service data that is used as a client signal of a FlexE is transmitted from a client device to a FlexE device by using a client link. A FlexE device that serves as an access node of a service uses a service clock as a reference source, generates a FlexE clock by using a phase-locked loop, and uses the FlexE clock as a clock of a PHY link in the FlexE. Frequency synchronization is performed hop by hop, on a transmission link in the FlexE by using the synchronous Ethernet technology, on one or more FlexE devices that serve as an intermediate node. A FlexE device that serves as an egress node of the service uses the FlexE clock as a reference source, and generates the service clock, to implement transparent transmission of the service clock.

However, when the service frequency is transparently transmitted by using the synchronous Ethernet technology, a service clock of only one service in the FlexE can be used as a reference, and a requirement of only one service for transparently transmitting a service frequency can be resolved. As a bearer network, the FlexE carries various types of services, for example, a CPRI service, and an SDH service. When a plurality of services has the requirement for transparently transmitting a service frequency, and service clocks of the services have different sources, the synchronous Ethernet technology cannot implement transparent transmission of service frequencies of the plurality of services.

Figure 9A:
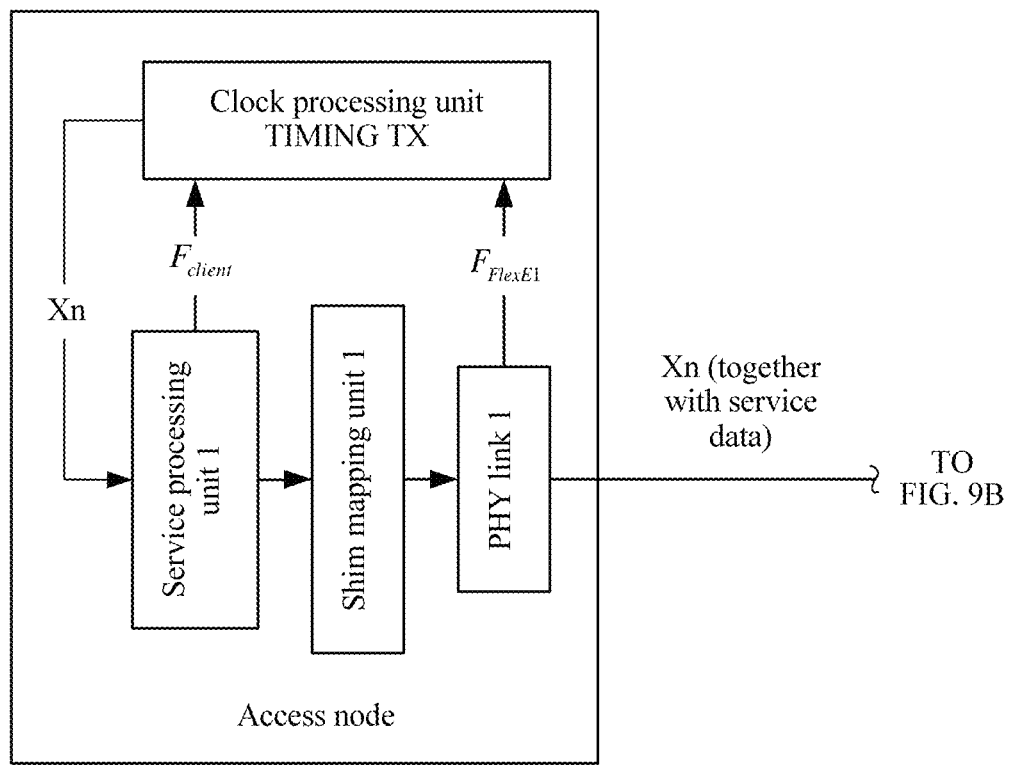
FIG. 9A, FIG. 9B, and FIG. 9C are a schematic architectural diagram of a system for transparently transmitting a service frequency according to an embodiment of this application.
Figure 9B:
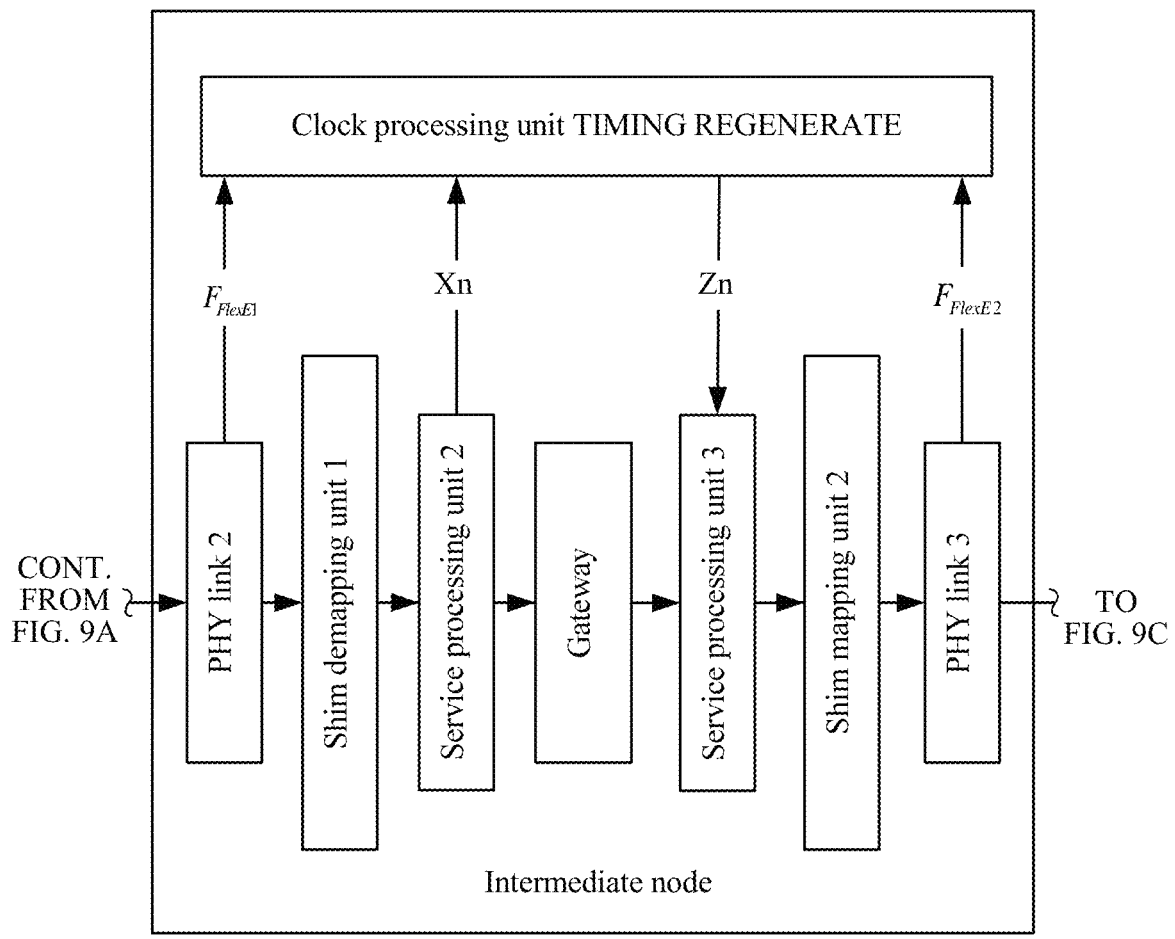
Figure 9C:
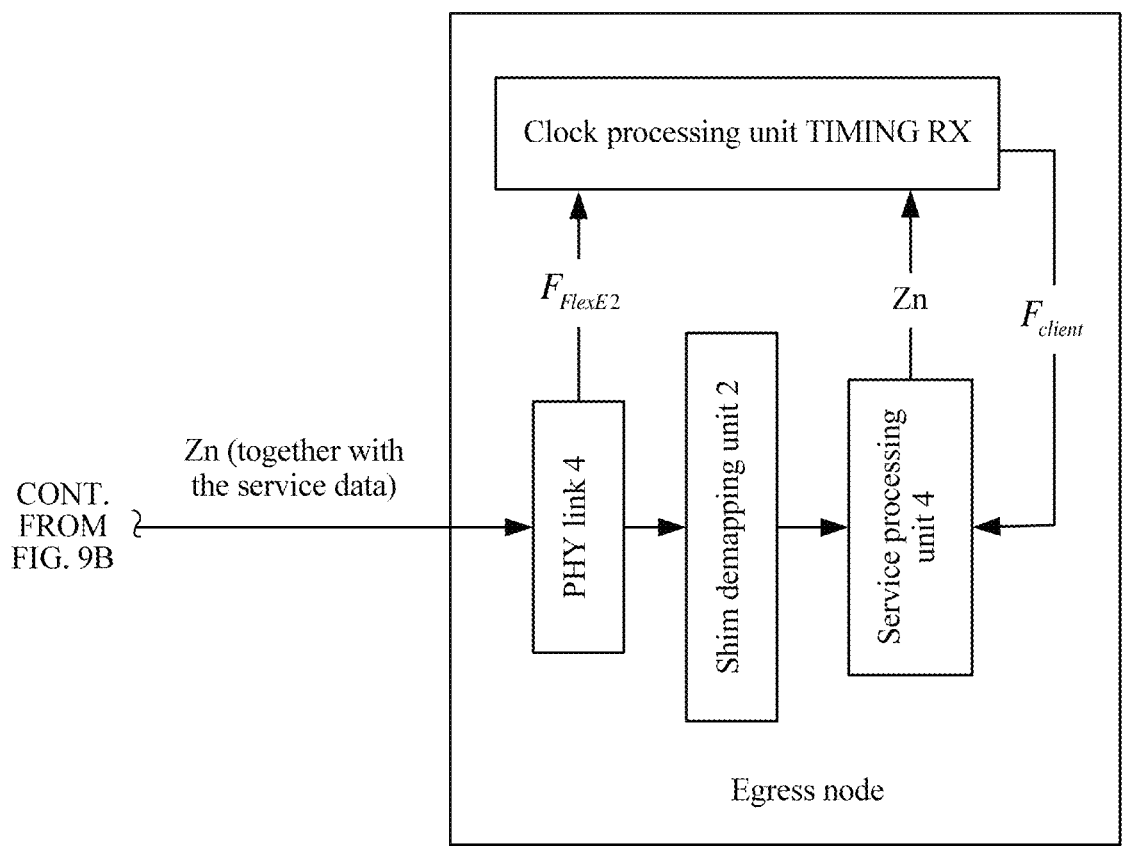

To resolve the foregoing problem, an embodiment of this application provides a method for transparently transmitting a service frequency. FIG. 9A, FIG. 9B, and FIG. 9C are a schematic architectural diagram of a system for transparently transmitting a service frequency according to an embodiment of this application. FIG. 9A, FIG. 9B, and FIG. 9C show an architecture of a multi-hop cascading networking mode of a FlexE. The figure is described by using an example in which one intermediate node exists. However, the multi-hop cascading networking mode in this embodiment of this application is not limited thereto.

In the FlexE, a communication link may be unidirectional or bidirectional.

FIG. 9A, FIG. 9B, and FIG. 9C are described by using a unidirectional communication link in a multi-hop cascading networking mode as an example. A system of the multi-hop cascading networking mode of the unidirectional communication link includes an access node, an intermediate node, and an egress node. After service data enters the access node by using a client link, the service data is mapped to a PHY link in the FlexE, and is transmitted to a lower-level device. The lower-level device may be the intermediate node. The access node may be connected to one or more intermediate nodes in a cascade manner. Data is transmitted between an intermediate node and another intermediate node and between an intermediate node and the egress node by using the PHY link. The egress node demaps the service data from the PHY link, and performs subsequent transmission by using a client link again.

The access node includes a clock processing unit TIMING TX, a service processing (CLIENT) unit 1, a shim mapping (SHIM_MUX) unit 1, and a PHY link 1. The service processing unit 1 works in a mapping direction. For first service data, the service processing unit 1 is configured to: complete rate matching of the service data, and insert first service frequency information Xn. The clock processing unit TIMING TX receives a service frequency $F_{client}$ from the service processing unit 1, receives a sending frequency $F_{FlexE1}$ of the FlexE from the PHY link 1, and generates the first service frequency information Xn. The shim mapping unit 1 may be a SHIM_MUX unit defined in a FlexE standard, and is configured to map the service data to the PHY link 1. The PHY link 1 is an interface defined in the FlexE standard.

In this embodiment of this application, the access node records service frequency information (for example, the first service frequency information Xn corresponding to the first service data and second service frequency information Wm corresponding to second service data) of each service, and transmits the service frequency information of each service to the lower-level device. At the access node, a relationship between a service frequency of each service and the sending frequency $F_{FlexE1}$ of the FlexE of the access node is calculated by using a sending frequency (namely, a frequency of the FlexE) of the access node as a reference, to obtain the service frequency information. The service frequency information may be transmitted to the lower-level device by using an overhead code block of the Flex. In this case, one or more fields in the overhead code block of the Flex need to be defined to carry service frequency information of one or more services. The service frequency information of each service may also be transmitted together with respective data in a channel. To be specific, the service frequency information of each service is encapsulated into a code block, and the code block is inserted into a data stream of the service data for transmission. In one embodiment, the service frequency information may be encapsulated into a code block identified by O code. Alternatively, a code block in which the service frequency information is encapsulated may be marked by another special identifier.

It should be understood that, in the embodiments of this application, the code block in which the service frequency information is encapsulated may be an S/T bit code block, a 64/66B code block, an 8/10B code block, or the like.

It should be further understood that the O code is O code, and a type field (type field) of the O code may be 0x4B. Currently, 0x0 and 0xF are used for 0 code that has been standardized in 802.3. Currently, O code of a FlexE overhead block 1 defined in OIF FlexE IA 1.0 is 0x5.

The intermediate node includes a clock processing unit TIMING REGENERATE, a PHY link 2, a shim demapping (SHIM_DEMUX) unit 1, a service processing unit 2, a gateway (SWITCH), a service processing (CLIENT) unit 3, a shim mapping unit 2, and a PHY link 3. The shim demapping unit 1 may be a SHIM_DEMUX unit defined in the FlexE standard, and is configured to demap the service data from the PHY link 2. The service processing unit 2 works in a demapping direction, and is configured to complete parsing of the service data and parsing of the service frequency information. The gateway is a switching component of the FlexE. The service processing unit 3 works in a mapping direction. For the first service data, the service processing unit 3 is configured to: complete rate matching of the service data, and insert first service frequency information Zn. The processing unit TIMING REGENERATE receives a receiving frequency $F_{FlexE1}$ of the FlexE from the PHY link 2, receives the first service frequency information Xn from the service processing unit 2, receives a sending frequency $F_{FlexE2}$ of the FlexE from the PHY link 3, and generates the new first service frequency information Zn based on the foregoing information. The shim mapping unit 2 may be a SHIM_MUX unit defined in the FlexE standard, and is configured to map the first service data to the PHY link 3. The PHY link 2 and the PHY link 3 are interfaces defined in the FlexE standard.

For the multi-hop cascading networking mode, in a process of transmitting FlexE data, although each level of device has a same nominal frequency, a specific difference exists in actual frequencies. If each FlexE device uses a nominal FlexE frequency as a reference, a statistics result of service frequency information is inaccurate. Consequently, service frequency recovery performance is poor. In this embodiment of this application, the service frequency information may be recalculated at each intermediate node based on actual FlexE frequencies (including a sending frequency and a receiving frequency) of the intermediate node.

The intermediate node of the service transmission link does not need to parse all service data, or even recover the service frequency. The service frequency information may be recalculated based on a receiving frequency of the intermediate node, the service frequency information, and a sending frequency of the intermediate node. The intermediate node may encapsulate the recalculated service frequency information into a code block, insert the code block into the data stream of the service data, and transmit the data stream of the service data to a lower-level device.

The egress node includes a clock processing unit TIMING RX, a PHY link 4, a shim demapping unit 2, and a service processing unit 4. The PHY link 4 is an interface defined in the FlexE standard. The shim demapping unit 2 may be a SHIM_DEMUX unit defined in the FlexE standard, and is configured to demap the service data from the PHY link 4. The service processing unit 4 works in a demapping direction, and is configured to complete parsing of the service data and parsing of the service frequency information. For the first service data, the processing unit TIMING RX receives the first service frequency information Zn from the service processing unit 4, receives a receiving frequency $F_{FlexE2}$ of the FlexE from the PHY link 4, and recovers the service frequency $F_{client}$ of the first service data based on the foregoing information.

Figure 10:
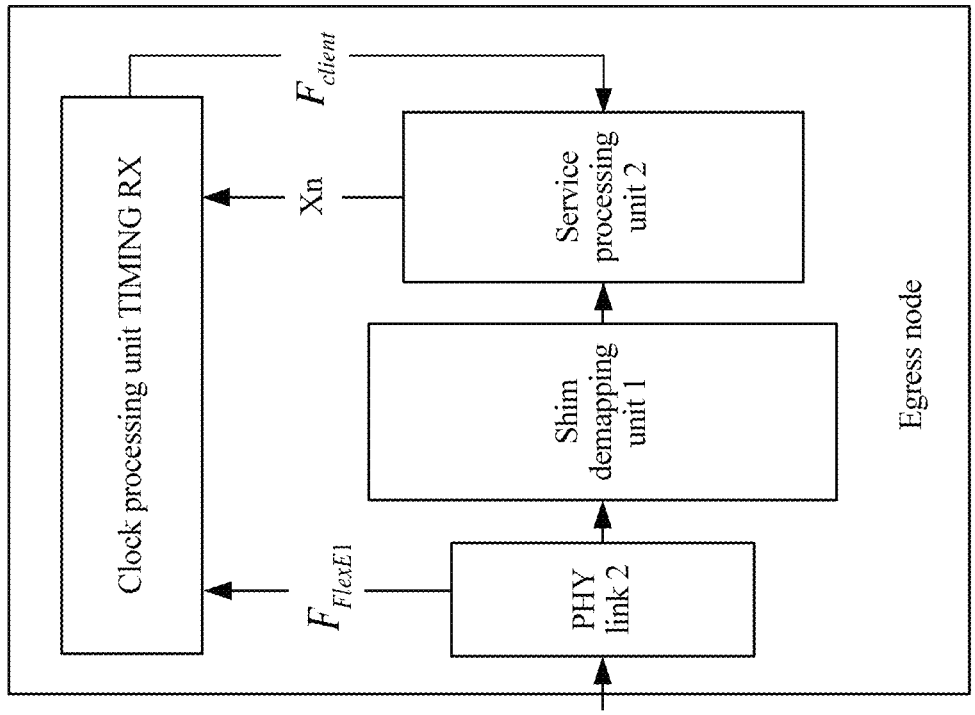
FIG. 10 is a schematic architectural diagram of a system for transparently transmitting a service frequency according to another embodiment of this application.
Figure 10:
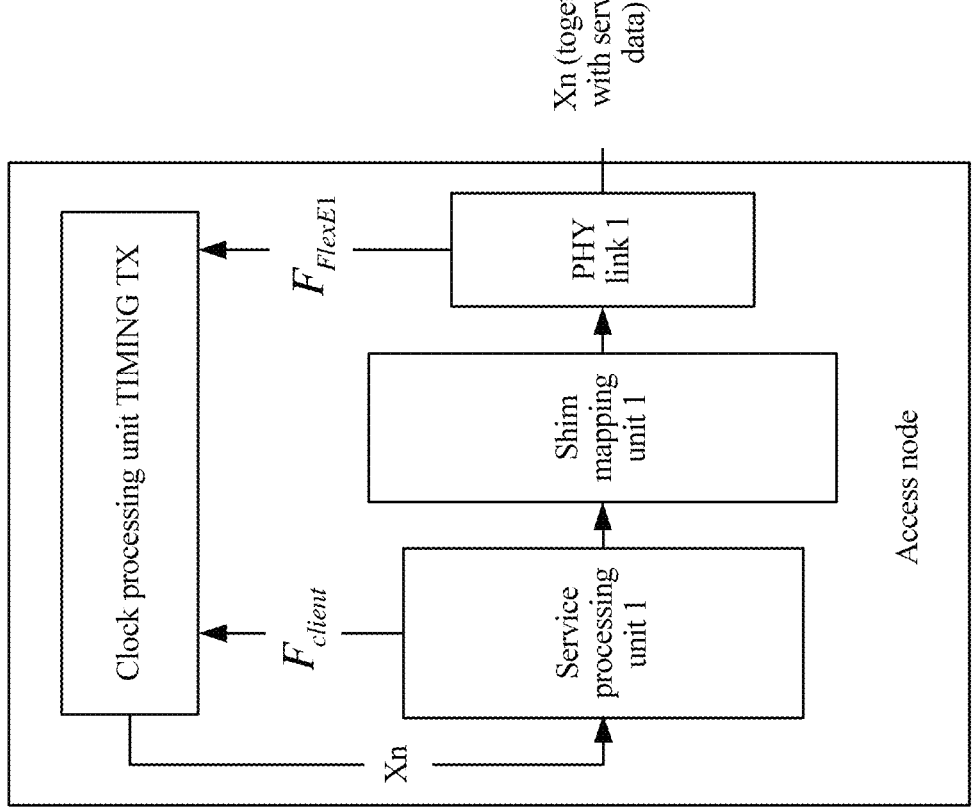

FIG. 10 is a schematic architectural diagram of a system for transparently transmitting a service frequency according to another embodiment of this application. FIG. 10 is described by using a unidirectional communication link in a single-hop networking mode as an example. A system of the single-hop networking mode of the unidirectional communication link includes an access node and an egress node. After service data enters the access node by using a client link, the service data is mapped to a PHY link in a FlexE, and is transmitted to a lower-level device, namely, the egress node. The egress node demaps the service data from the PHY link, and performs subsequent transmission by using a client link again.

The access node includes a clock processing unit TIMING TX, a service processing (CLIENT) unit 1, a shim mapping (SHIM_MUX) unit 1, and a PHY link 1. The service processing unit 1 works in a mapping direction, and is configured to: complete rate matching of the service data, and insert service frequency information Xn. For first service data, the processing unit TIMING TX receives a service frequency $F_{client}$ of the first service data from the service processing unit 1, receives a sending frequency $F_{FlexE1}$ of the FlexE from the PHY link 1, and generates the first service frequency information Xn. The shim mapping unit 1 may be a SHIM_MUX unit defined in a FlexE standard, and is configured to map the first service data to the PHY link 1. The PHY link 1 is an interface defined in the FlexE standard.

The egress node includes a clock processing unit TIMING RX, a PHY link 2, a shim demapping unit 1, and a service processing unit 2. The PHY link 2 is an interface defined in the FlexE standard. The shim demapping unit 1 may be a SHIM_DEMUX unit defined in the FlexE standard, and is configured to demap a data stream of the first service data from the PHY link 2. The service processing unit 2 works in a demapping direction, and is configured to complete parsing of the service data and parsing of the service frequency information. For the first service data, the processing unit TIMING RX receives the first service frequency information Xn from the service processing unit 2, receives a receiving frequency $F_{FlexE1}$ of the FlexE from the PHY link 2, and recovers the service frequency $F_{client}$ of the first service data based on the foregoing information.

A function of each node in the single-hop networking mode is similar to a function of a corresponding node in a multi-hop cascading networking mode. Details are not described herein again.

The following describes in detail the method for transparently transmitting a service frequency according to the embodiments of this application from a perspective of each node.

Figure 11:
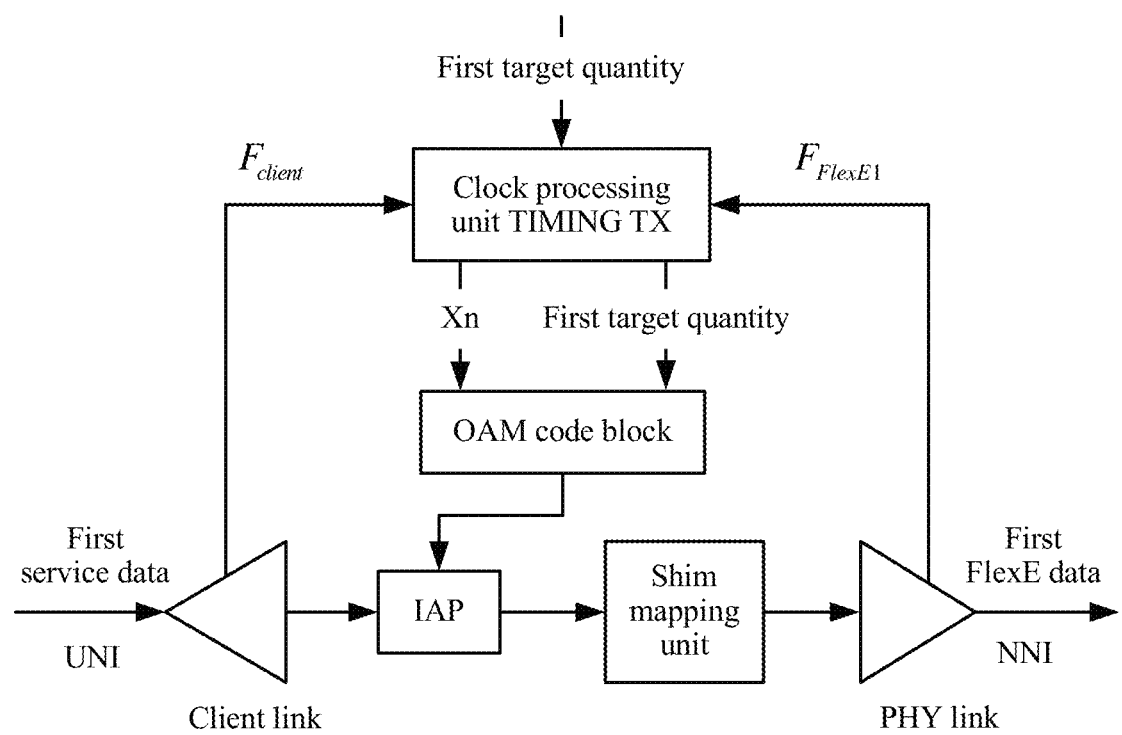
FIG. 11 is a schematic diagram of a method for transparently transmitting a service frequency by an access node according to an embodiment of this application.
Figure 12:
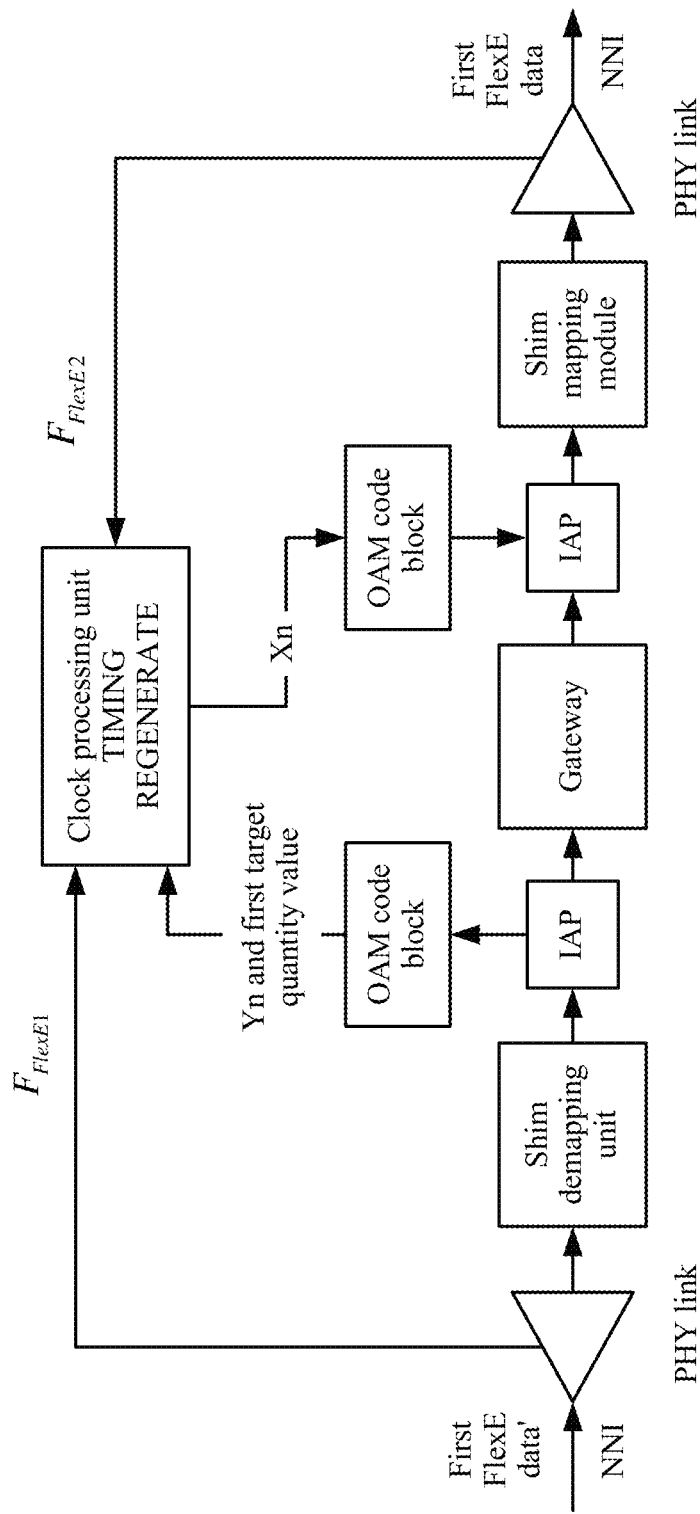
FIG. 12 is a schematic diagram of a method for transparently transmitting a service frequency by an intermediate node according to an embodiment of this application.

An access node or an intermediate node is considered as a first device, a lower-level device is a second device, and the second device may be an intermediate node or an egress node. FIG. 11 is a schematic diagram of a method for transparently transmitting a service frequency by an access node according to an embodiment of this application. FIG. 12 is a schematic diagram of a method for transparently transmitting a service frequency by an intermediate node according to an embodiment of this application. With reference to FIG. 11 and FIG. 12, the method for transparently transmitting a service frequency may include the following operations.

Operation 1. A first device determines first service frequency information Xn, where the first service frequency information Xn is used to indicate an amount of n-bit first service data that is sent by the first device within first statistical duration, a sending frequency of the first device is used as a reference for the first statistical duration, and n is a positive integer.

It should be understood that the first service data herein is data of a to-be-discussed target service. In a FlexE, there may be more pieces of service data, for example, second service data, and third service data. This is not limited in this embodiment of this application.

It should be further understood that the first statistical duration may be determined based on a rate of the first service data. If the rate of the first service data is lower than a specific threshold, relatively long first statistical duration may be determined, for example, the first statistical duration is longer than a length of a basic frame or a multiframe. If the rate of the first service data is higher than a specific threshold, relatively short first statistical duration may be determined, for example, the first statistical duration is shorter than a length of a basic frame or a multiframe.

The first statistical duration may be a first target quantity of transmit clock cycles. That a first device determines first service frequency information Xn may include: The first device calculates the first service frequency information Xn by using the first target quantity (for example, ticks) of transmit clock cycles as a statistics window. It should be understood that statistics about Cn is collected by using a frame as a period in an OTN. As a bearer network, the FlexE may carry various types of services, and rates of different types of services greatly vary. For a service with a relatively low rate, if a statistical period is relatively short, an error is relatively large. For a service with a relatively high rate, a statistical period does not need to be very long. Therefore, in this embodiment of this application, the first service frequency information Xn is calculated by using ticks of transmit clock cycles as a reference. The ticks may be customized by a network administrator based on a service frequency (which may be predefined or defined based on real-time service transmission), or may be defined by a corresponding control device in the FlexE based on a service frequency, to adapt to services of different rates. In other words, the network administrator or the control device in the FlexE may determine proper statistical duration (a length of the statistics window) based on a service rate, for example, the ticks of transmit clock cycles of the FlexE are used as the statistical duration. In this embodiment of this application, when the service frequency information is calculated, statistical duration is periodically decoupled from the basic frame and the multiframe, and optimal statistical duration may be accordingly selected based on the service rate, so that the service frequency information obtained through statistics collection is more accurate. In addition, overheads of the FlexE are affected by insertion of an AM, and consequently, an overhead period is unstable. The customized statistical duration in this embodiment of this application is not affected by other overheads, and a period is stable with no jitters. The stable statistical duration also enables the service frequency information obtained through statistics collection to be smoother, a clock that is recovered by an egress node based on the service frequency information is smoother, and a jitter is smaller.

In one embodiment, the first device may encapsulate, into a first S/T bit code block, the first service frequency information Xn and first statistical duration information that is used to indicate the first statistical duration, and send the first S/T bit code block to a second device. The first statistical duration information may be absolute duration of the first statistical duration, or may be information about the first target quantity (ticks), to reduce a quantity of bits. In one embodiment, the first statistical duration information and the first service frequency information may also be separately encapsulated and separately sent to the second device. The first S/T bit code block may also be referred to as an operation, administration and maintenance (Operation, Administration, Maintenance, OAM) code block.

The ticks may be a system preset value. In this case, there is no need to transmit information used to indicate the target quantity (ticks). Alternatively, the ticks may be uniformly notified to all devices in a system by a control element of the system. Certainly, the first device may also calculate the first service frequency information Xn by using the basic frame or the multiframe as the first statistical duration. This is not limited in this embodiment of this application.

Specifically, when the first device is an access node, the method may further include: The first device determines the first statistical duration based on the rate of the first service data. That a first device determines first service frequency information Xn includes: The first device collects statistics about the amount of n-bit first service data that is sent within the first statistical duration. The amount is Xn.

The first device may determine the first statistical duration based on the rate of the first service data. For example, if the rate of the first service data is relatively low, relatively long first statistical duration may be determined, for example, first statistical duration longer than the length of the basic frame or the multiframe. If the rate of the first service data is relatively high, relatively short first statistical duration may be determined, for example, first statistical duration shorter than the length of the basic frame or the multiframe.

The first service data requiring that a service frequency is transparently transmitted enters the access node with a bit width of an integer multiple of n bits by using a user network interface (UNI). The UNI is also referred to as a user side interface, to be specific, an interface between a network and a user, and the UNI is a client link interface. A service frequency of a first service is $F_{client}$ and the service frequency of the first service data is also a receiving frequency of the access node. A clock frequency of the FlexE is $F_{FlexE1}$, and the clock frequency of the FlexE is also the sending frequency of the access node. The access node calculates the first service frequency information Xn of the first service. Specifically, the access node may collect statistics about the amount of n-bit first service data that is sent within the first statistical duration, for example, an amount of n-bit first service data that is sent by the first device within ticks of transmit clock cycles, to obtain the Xn. Alternatively, the first device may calculate the Xn in another manner.

In one embodiment, the first service frequency information Xn may be shown in the following formula (1).

$$Xn=(F_{client}/n)\times(\text{ticks}/F_{FlexE1}) \qquad (1)$$

It should be understood that another parameter or coefficient may also be introduced to the first service frequency information Xn. Alternatively, when n is a parameter preset by the system or known by all devices in a FlexE network, the first service frequency information Xn may not include n. Therefore, the first service frequency information Xn may be shown in the following formula (2).

$$Xn=AgF_{client}/F_{FlexE1} \qquad (2)$$

A is a frequency coefficient, $F_{client}$ is an original service frequency of the first service data, and $F_{FlexE1}$ is the sending frequency of the access node.

It should be understood that, when another parameter or coefficient is introduced to the first service frequency information Xn, a value of the first service frequency information Xn may be equal to the amount of n-bit first service data that is sent within the first statistical duration, or may not be equal to the amount, but only correspond to the amount, or a lower-level device may calculate a value of the amount based on related information. This is not limited in this embodiment of this application.

When the first device is an intermediate node, the first device further receives a data stream of the first service data, where the data stream of the first service data is sent by a third device, and parses out first service frequency information Yn from a second S/T bit code block of the data stream of the first service data. That a first device determines first service frequency information Xn includes: The first device collects, based on the first service frequency information Yn, statistics about the amount of n-bit first service data that is sent within the first statistical duration, to obtain the first service frequency information Xn.

In one embodiment, the first statistical duration information is further encapsulated in the second S/T bit code block, and the first statistical duration information is used to indicate the first statistical duration. The first statistical duration information may be the first target quantity.

The intermediate node receives, by using an NNI, first FlexE data sent by an upper-level node, and the first FlexE data includes a value of the ticks that is used to indicate the information about the first target quantity and the first service frequency information Yn. The intermediate node demaps the first FlexE data by using a shim demapping unit, and reads the Yn and the value of the ticks from the first FlexE data. Specifically, for example, the OAM code block may be found by using an O code identifier of a code block, and then the Yn and the value of the ticks are read. A clock processing unit TIMING REGENERATE evenly disperses the Yn into the received first FlexE data based on a receiving frequency $F_{FlexE1}$, uses ticks of FlexE transmit clock cycles (corresponding to a sending frequency $F_{FlexE2}$) of the intermediate node as a statistics window, and recollects statistics about dispersed first service frequency information, to obtain the Xn. It should be understood that, if the intermediate node recovers the service data, cache needs to be added to absorb a data gap obtained after a stuff code block is removed, and recovering the service data needs a clock recovery circuit. As a result, costs are higher. In this embodiment of this application, the intermediate node does not need to parse and recover the service data, but directly reads the service frequency information Yn and the value of the ticks of the upper-level node, and no cache needs to be additionally added, so that a service delay is smaller.

Operation 2. The first device encapsulates the first service frequency information Xn into a first S/T bit code block, inserts the first S/T bit code block into a data stream of the first service data, and sends the data stream of the first service data to a second device, where S and T are positive integers.

In one embodiment, the first S/T bit code block is an S/T bit code block identified by O code.

In a specific example, the access node encapsulates the calculated first service frequency information Xn and the value of the ticks into the S/T bit code block identified by the O code, to be specific, the OAM code block. An idle adjustment unit (IAP), also referred to as an idle addition/deletion unit, places the OAM code block in a location in which a common stuff code block is originally to be placed, or the OAM code block is used as a type of stuff code block, and is filled between data code blocks used to carry the first service data. Alternatively, the IAP uses the stuff code block to fill a gap between the data code blocks carrying the first service data, and then the stuff code block is replaced with the OAM code block. The IAP maps these code blocks to a PHY link by using a shim mapping unit. In other words, the Xn, the value of the ticks, and a service code block in the FlexE data constitute a data stream of the first FlexE data, and the data stream of the first FlexE data is transmitted to the lower-level device by using a network to network interface (NNI).

In one embodiment, a second service may be further transmitted in a link in the FlexE. In one embodiment, the method for transparently transmitting a service frequency may further include: The first device determines second service frequency information Wm, where the second service frequency information Wm is used to indicate an amount of m-bit second service data that is sent by the first device within second statistical duration, the sending frequency of the first device is used as a reference for the second statistical duration, and m is a positive integer; and the first device encapsulates the second service frequency information Wm into a third S/T bit code block, inserts the third S/T bit code block into a data stream of the second service data, and sends the data stream of the second service data to the second device. It should be understood that the method for transparently transmitting a service frequency in this embodiment of this application can support a plurality of pieces of service data with a requirement for transparently transmitting a service frequency in simultaneously accessing the link in the FlexE without changing an existing FlexE standard. Because a stuff code block is inserted into a data stream of each service with the requirement for transparently transmitting a service frequency to perform rate matching in the FlexE, inserting service frequency information into a data stream of respective service data and properly using bandwidth allocated to the service according to the method in this embodiment of this application does not affect another service, and scalability is strong.

Figure 13:
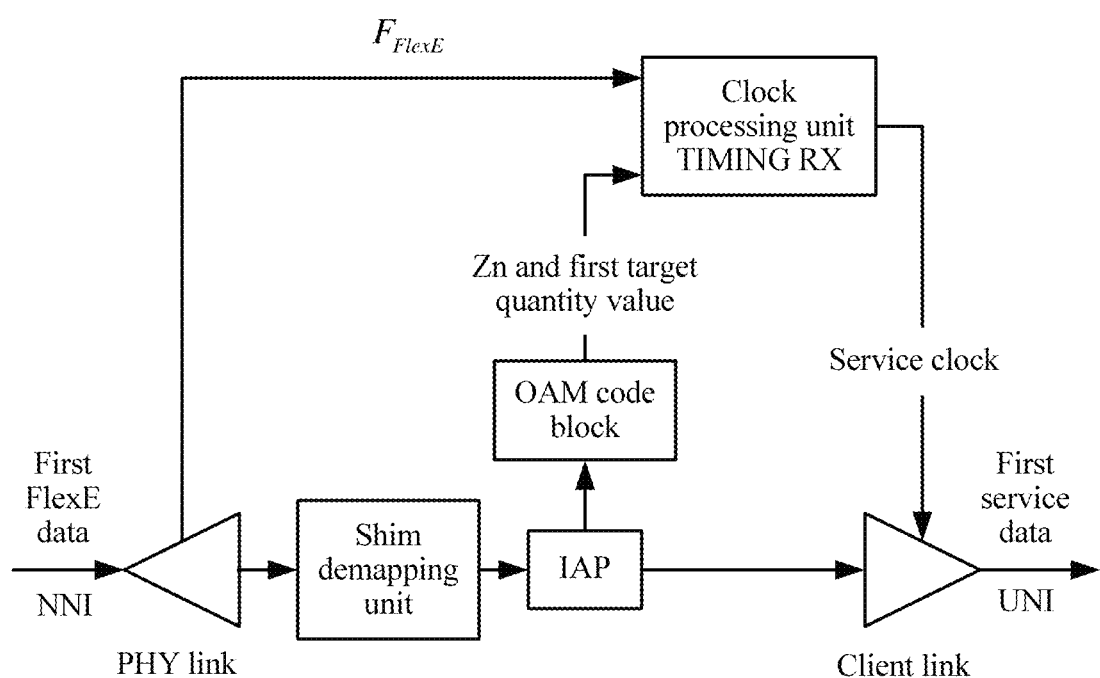
FIG. 13 is a schematic diagram of a method for transparently transmitting a service frequency by an egress node according to an embodiment of this application.

The following describes the method for transparently transmitting a service frequency from a perspective of an egress node. The egress node is a fourth device, and an upper-level node of the egress node is a fifth device. FIG. 13 is a schematic diagram of a method for transparently transmitting a service frequency by an egress node according to an embodiment of this application. With reference to FIG. 13, the method for transparently transmitting a service frequency may include the following operations.

Operation 1. A fourth device receives a data stream of first service data, where the data stream of the first service data is sent by a fifth device, the data stream of the first service data includes a first S/T bit code block, the first S/T bit code block includes first service frequency information Zn, the first service frequency information Zn is used to indicate an amount of n-bit first service data that is sent by the fifth device within first statistical duration, a sending frequency of the fifth device is used as a reference for the first statistical duration, and n, S, and T are positive integers.

In one embodiment, the first S/T bit code block is an S/T bit code block identified by O code.

In one embodiment, the first service frequency information $Zn=AgF_{client}/F_{FlexE}$, A is a frequency coefficient, $F_{client}$ is an original service frequency of the first service data, and $F_{FlexE}$ is the sending frequency of the fifth device.

Operation 2. The fourth device recovers, based on the first service frequency information Zn, a clock corresponding to the first service data.

In one embodiment, the method for transparently transmitting a service frequency may further include: First statistical duration information is further encapsulated in the first S/T bit code block, and the first statistical duration information is used to indicate the first statistical duration; and that the fourth device recovers, based on the first service frequency information Zn, a clock corresponding to the first service data in operation 2 may include: The fourth device recovers, based on the first service frequency information Zn and the first statistical duration information, the clock corresponding to the first service data.

Specifically, an egress node receives, by using an NNI, first FlexE data sent by an upper-level node. The first FlexE data includes the first service frequency information Zn and a value of ticks. The egress node demaps the first FlexE data by using a shim demapping unit, and reads the Zn and the value of the ticks from the first FlexE data. A processing unit TIMING RX recovers the service frequency $F_{client}$ of a first service based on a receiving frequency $F_{FlexE}$, the Zn, and the value of the ticks, to be specific, recovers the service clock of the first service, where the service clock is used as a transmit clock of a client link.

In one embodiment, a second service may be further transmitted in a link in a FlexE. In one embodiment, the method for transparently transmitting a service frequency may further include: The fourth device receives a data stream of second service data, where the data stream of the second service data is sent by the fifth device, the data stream of the second service data includes a second S/T bit code block, the second S/T bit code block includes second service frequency information Vm, the second service frequency information Vm is used to indicate an amount of n-bit second service data that is sent by the fifth device within second statistical duration, the sending frequency of the fifth device is used as a reference for the second statistical duration, and m is a positive integer; and the fourth device recovers, based on the second service frequency information Vm, a clock corresponding to the second service data.

The access node and the egress node in the foregoing embodiments may constitute a FlexE system in a single-hop networking mode. The access node generates service frequency information, and the egress node recovers a service clock based on the service frequency information, to implement a function of transparently transmitting a service frequency. The access node, at least one intermediate node, and the egress node may constitute a FlexE system in a multi-hop cascading networking mode. The access node generates service frequency information, the intermediate node regenerates service frequency information, and the egress node recovers a service clock based on the service frequency information, to implement a function of transparently transmitting a service frequency. The single-hop networking mode has a simple environment, and there is no process of recalculating service frequency information by the intermediate node. It should be understood that a simpler networking environment indicates that transmission damage to service frequency information is less and a recovered service frequency/service clock is more accurate.

The foregoing describes the method for transparently transmitting a service frequency according to the embodiments of this application. The following describes a device for transparently transmitting a service frequency according to an embodiment of this application.

The device for transparently transmitting a service frequency in this application may correspond to a packet bearer device, for example, an Internet Protocol (IP) radio access network (RAN) device and a packet transport network (PTN) device that plan to load a FlexE. A device at an access node of a network implements functions of generating service frequency information and inserting the service frequency information into a stuff code block in the embodiments of this application, for example, a box-shaped device may implement the functions by using an interface card, or a frame-shaped device may implement the functions by using an interface chip of a line card. A device at an intermediate node of a network implements a function of regenerating service frequency information in the embodiments of this application, for example, a box-shaped device may implement the function by using an interface card, or a frame-shaped device may implement the function by using an interface chip of a line card. A device at an egress node of a network implements a function of recovering a service clock in the embodiments of this application, for example, a box-shaped device may implement the function by using an interface card, or a frame-shaped device may implement the function by using an interface chip of a line card.

Figure 14:
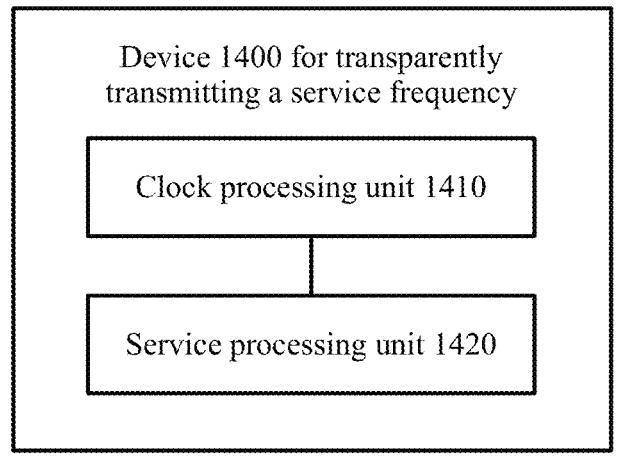
FIG. 14 is a schematic block diagram of a device for transparently transmitting a service frequency according to an embodiment of this application.

FIG. 14 is a schematic block diagram of a device 1400 for transparently transmitting a service frequency according to an embodiment of this application. The device 1400 for transparently transmitting a service frequency is a first device. As shown in FIG. 14, the device 1400 for transparently transmitting a service frequency may include:

a clock processing unit 1410, configured to determine first service frequency information Xn, where the first service frequency information Xn is used to indicate an amount of n-bit first service data that is sent by the first device within first statistical duration, a sending frequency of the first device is used as a reference for the first statistical duration, and n is a positive integer; and a service processing unit 1420, configured to: encapsulate the first service frequency information Xn determined by the clock processing unit 1410 into a first S/T bit code block, insert the first S/T bit code block into a data stream of the first service data, and send the data stream of the first service data to a second device, where S and T are positive integers.

In one embodiment, the first S/T bit code block is an S/T bit code block identified by O code.

In one embodiment, first statistical duration information is further encapsulated in the first S/T bit code block, and the first statistical duration information is used to indicate the first statistical duration.

In one embodiment, the first statistical duration is a first target quantity of transmit clock cycles, and the first statistical duration information includes the first target quantity.

In one embodiment, the clock processing unit 1410 is further configured to determine the first statistical duration based on a rate of the first service data; and that the clock processing unit 1410 determines the first service frequency information Xn includes: collecting statistics about the amount of n-bit first service data that is sent within the first statistical duration.

In one embodiment, the service processing unit 1420 is further configured to: receive the data stream of the first service data, where the data stream of the first service data is sent by a third device, and parse out first service frequency information Yn from a second S/T bit code block of the data stream of the first service data; and the clock processing unit 1410 is specifically configured to calculate, based on the first service frequency information Yn, the amount of n-bit first service data that is sent within the first statistical duration, to obtain the first service frequency information Xn.

In one embodiment, the first statistical duration information is further encapsulated in the second S/T bit code block, and the first statistical duration information is used to indicate the first statistical duration.

In one embodiment, the clock processing unit 1410 is further configured to determine second service frequency information Wm, where the second service frequency information Wm is used to indicate an amount of m-bit second service data that is sent by the first device within second statistical duration, the sending frequency of the first device is used as a reference for the second statistical duration, and m is a positive integer; and the service processing unit 1420 is further configured to: encapsulate the second service frequency information Wm into a third S/T bit code block, insert the third S/T bit code block into a data stream of the second service data, and send the data stream of the second service data to the second device.

In one embodiment, the first service frequency information $Xn = AgF_{client}/F_{FlexE}$, A is a frequency coefficient, $F_{client}$ is a service frequency of the first service data, and $F_{FlexE}$ is the sending frequency of the first device.

It should be understood that the clock processing unit 1410 may correspond to the clock processing unit TIMING TX or the clock processing unit TIMING REGENERATE in FIG. 9A, FIG. 9B, FIG. 9C, and FIG. 10. The service processing unit 1420 may correspond to the service processing unit, the shim mapping unit, the PHY link, and the like in FIG. 9A, FIG. 9B, FIG. 9C, and FIG. 10.

It should be understood that some functions of the clock processing unit 1410 and the service processing unit 1420 in this embodiment of this application may be implemented by a processor or a processor-related circuit component, and some functions of the service processing unit 1420 may be implemented by a network interface or a network interface-related circuit component.

Figure 15:
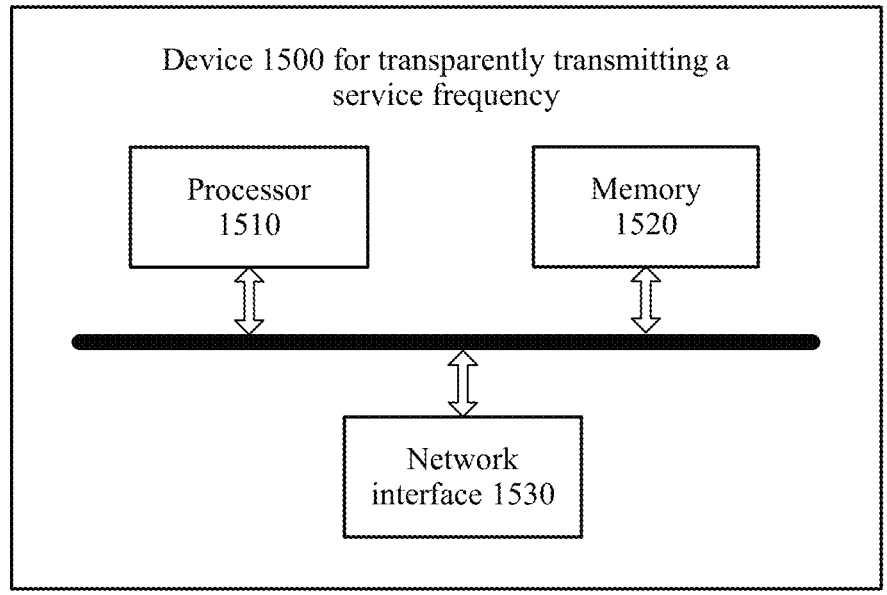
FIG. 15 is a schematic block diagram of a device for transparently transmitting a service frequency according to another embodiment of this application.

As shown in FIG. 15, an embodiment of this application further provides a device 1500 for transparently transmitting a service frequency. The device 1500 for transparently transmitting a service frequency is a first device. The device 1500 for transparently transmitting a service frequency includes a processor 1510, a memory 1520, and a network interface 1530. The memory 1520 is configured to store an instruction. The processor 1510 and the network interface 1530 are configured to execute the instruction stored in the memory 1520.

It should be understood that the device 1400 for transparently transmitting a service frequency shown in FIG. 14 or the device 1500 for transparently transmitting a service frequency shown in FIG. 15 may be configured to perform an operation or a procedure related to a terminal device in the foregoing method embodiment, and operations and/or functions of the modules in the device 1400 for transparently transmitting a service frequency or the device 1500 for transparently transmitting a service frequency are separately used to implement a corresponding procedure in the foregoing method embodiment. For brevity, details are not described herein again.

Figure 16:
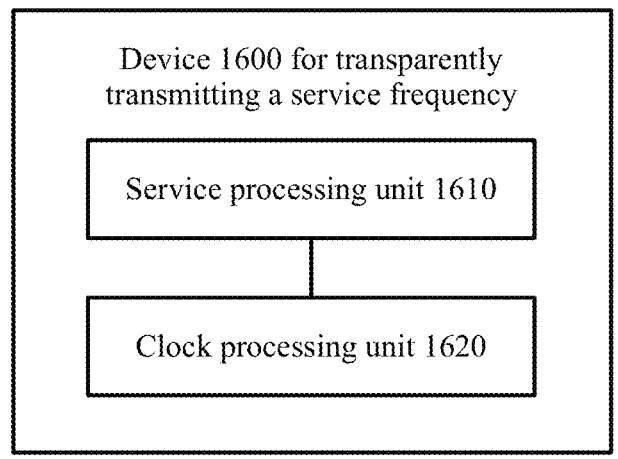
FIG. 16 is a schematic block diagram of a device for transparently transmitting a service frequency according to another embodiment of this application.

FIG. 16 is a schematic block diagram of a device 1600 for transparently transmitting a service frequency according to an embodiment of this application. The device 1600 for transparently transmitting a service frequency is a fourth device. As shown in FIG. 16, the device 1600 for transparently transmitting a service frequency may include:

a service processing unit 1610, configured to receive a data stream of first service data, where the data stream of the first service data is sent by a fifth device, the data stream of the first service data includes a first S/T bit code block, the first S/T bit code block includes first service frequency information Zn, the first service frequency information Zn is used to indicate an amount of n-bit first service data that is sent by the fifth device within first statistical duration, a sending frequency of the fifth device is used as a reference for the first statistical duration, and n, S, and T are positive integers; and a clock processing unit 1620, configured to recover, based on the first service frequency information Zn, a clock corresponding to the first service data.

In one embodiment, the first S/T bit code block is an S/T bit code block identified by O code.

In one embodiment, first statistical duration information is further encapsulated in the first S/T bit code block, and the first statistical duration information is used to indicate the first statistical duration; and the clock processing unit 1620 is specifically configured to recover, based on the first service frequency information Zn and the first statistical duration information, the clock corresponding to the first service data.

In one embodiment, the first statistical duration is a first target quantity of transmit clock cycles, and the first statistical duration information includes the first target quantity.

In one embodiment, the service processing unit 1610 is further configured to receive a data stream of second service data, where the data stream of the second service data is sent by the fifth device, the data stream of the second service data includes a second S/T bit code block, the second S/T bit code block includes second service frequency information Vm, the second service frequency information Vm is used to indicate an amount of n-bit second service data that is sent by the fifth device within second statistical duration, the sending frequency of the fifth device is used as a reference for the second statistical duration, and m is a positive integer; and the clock processing unit 1620 is further configured to recover, based on the second service frequency information Vm, a clock corresponding to the second service data.

In one embodiment, the first service frequency information $Zn=AgF_{client}/F_{FlexE}$, A is a frequency coefficient, $F_{client}$ is a service frequency of the first service data, and $F_{FlexE}$ is the sending frequency of the fifth device.

It should be understood that the clock processing unit 1620 may correspond to the clock processing unit TIMING RX in FIG. 9A, FIG. 9B, FIG. 9C, and FIG. 10. The service processing unit 1610 may correspond to the service processing unit, the shim demapping unit, the PHY link, and the like in FIG. 9A, FIG. 9B, FIG. 9C, and FIG. 10.

It should be understood that some functions of the clock processing unit 1620 and the service processing unit 1610 in this embodiment of this application may be implemented by a processor or a processor-related circuit component, and some functions of the service processing unit 1610 may be implemented by a network interface or a network interface-related circuit component.

Figure 17:
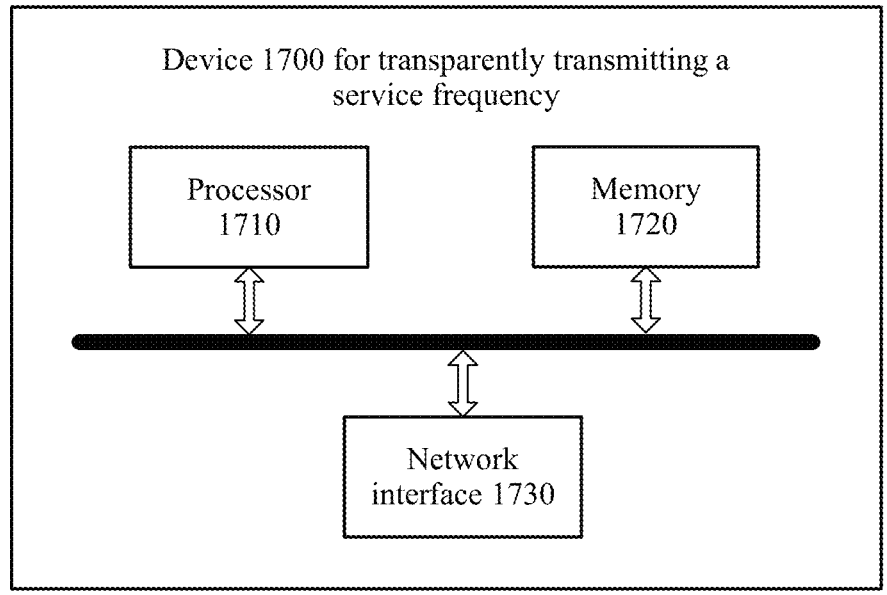
FIG. 17 is a schematic block diagram of a device for transparently transmitting a service frequency according to another embodiment of this application.

As shown in FIG. 17, an embodiment of this application further provides a device 1700 for transparently transmitting a service frequency. The device 1700 for transparently transmitting a service frequency is a fourth device. The device 1700 for transparently transmitting a service frequency includes a processor 1710, a memory 1720, and a network interface 1730. The memory 1720 is configured to store an instruction. The processor 1710 and the network interface 1730 are configured to execute the instruction stored in the memory 1720.

It should be understood that, the processor mentioned in the embodiments of this application may be a central processing unit (CPU), or may be another general purpose processor, a digital signal processor (DSP), an application-specific integrated circuit (ASIC), a field programmable gate array (Field Programmable Gate Array, FPGA) or another programmable logic device, a discrete gate or a transistor logic device, a discrete hardware component, or the like. The general purpose processor may be a microprocessor or the processor may be any conventional processor, or the like.

It should be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (storage module) is integrated into the processor.

It should be noted that the memory described in this specification aims to include but is not limited to these memories and any memory of another proper type.

An embodiment of this application further provides a computer-readable storage medium. The computer-readable storage medium stores an instruction. When the instruction runs on a computer, the computer is enabled to perform the methods in the foregoing method embodiments. Specifically, the computer may be the foregoing first device or the foregoing fourth device.

An embodiment of this application further provides a computer program product including an instruction. When a computer runs the instruction of the computer program product, the computer is enabled to perform the method in the foregoing method embodiment. Specifically, the computer program product may run on the foregoing first device or the foregoing fourth device.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

It should be understood that the first, the second, and various numbers in this specification are used for differentiation only for ease of description, instead of limiting the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the embodiments of this application.

A person of ordinary skill in the art may be aware that, the units and algorithm operations in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transparently transmitting a service frequency, comprising:
    receiving, by a first device, a data stream of a first service data sent by a third device, and parsing out first service frequency information Yn from a second S/T bit code block of the data stream of the first service data; determining, by s—the first device, first service frequency information Xn, wherein the first service frequency information Xn is used to indicate an amount of n-bit first service data that is sent by the first device within a first statistical duration, wherein a sending frequency of the first device is used as a reference for the first statistical duration, and wherein n is a positive integer, wherein the first service frequency information Xn is express as $Xn=Ag*F_{client}/F_{FlexE}$, wherein A is a frequency coefficient not equal to 1, and wherein $F_{client}$ is a service frequency of the first service data determined based on Yn;

calculating, by the first device based on the first service frequency information Yn, the amount of n-bit first service data that is sent within the first statistical duration, to obtain the first service frequency information Xn; and encapsulating, by the first device, the first service frequency information Xn into a first S/T bit code block, inserting the first S/T bit code block into a data stream of the first service data, and sending the data stream of the first service data to a second device, wherein S and T are positive integers.

2. The method according to claim 1, wherein the first S/T bit code block is an SIT bit code block identified by O code.

3. The method according to claim 1, wherein first statistical duration information is further encapsulated in the first S/T bit code block, and the first statistical duration information is used to indicate the first statistical duration.

4. The method according to claim 3, wherein the first statistical duration is a first target quantity of transmit clock cycles, and the first statistical duration information comprises the first target quantity.

5. The method according to claim 1, wherein the method further comprises: determining, by the first device, the first statistical duration based on a rate of the first service data; and wherein the determining, by the first device, the first service frequency information Xn comprises: collecting, by the first device, statistics about the amount of n-bit first service data that is sent within the first statistical duration.

6. The method according to claim 1, wherein the first statistical duration information is further encapsulated in the second S/T bit code block, and the first statistical duration information is used to indicate the first statistical duration.

7. The method according to claim 1, wherein the method further comprises:

determining, by the first device, second service frequency information Wm, wherein the second service frequency information Wm is used to indicate an amount of m-bit second service data that is sent by the first device within second statistical duration, the sending frequency of the first device is used as a reference for the second statistical duration, and m is a positive integer; and encapsulating, by the first device, the second service frequency information Wm into a third S/T bit code block, inserting the third S/T bit code block into a data stream of the second service data, and sending the data stream of the second service data to the second device.

8. The method according to claim 1, wherein $F_{FlexE}$ is the sending frequency of the first device.

9. A method for transparently transmitting a service frequency, comprising: receiving, by a fourth device, a data stream of first service data, wherein the data stream of the first service data is sent by a fifth device, the data stream of the first service data comprises a first S/T bit code block, the first S/T bit code block comprises first service frequency information Zn, the first service frequency information Zn is used to indicate an amount of n-bit first service data that is sent by the fifth device within a first statistical duration, a sending frequency of the fifth device is used as a reference for the first statistical duration, and n, S, and T are positive integers, wherein the first service frequency information Zn is expressed as $Zn=Ag*F_{client}/F_{FlexE}$, wherein A is a frequency coefficient not equal to 1, and wherein $F_{client}$ is a service frequency of the first service data;

determining the service frequency of the first service data based on the first service frequency information Zn;

and recovering, by the fourth device using the service frequency of the first service data, a clock corresponding to the first service data using the first service frequency information of the first service data.

10. The method according to claim 9, wherein the first S/T bit code block is an S/T bit code block identified by O code.

11. The method according to claim 9, wherein first statistical duration information is further encapsulated in the first S/T bit code block, and the first statistical duration information is used to indicate the first statistical duration; and the recovering, by the fourth device based on the first service frequency information Zn, the clock corresponding to the first service data comprises: recovering, by the fourth device based on the first service frequency information Zn and the first statistical duration information, the clock corresponding to the first service data.

12. The method according to claim 11, wherein the first statistical duration is a first target quantity of transmit clock cycles, and the first statistical duration information comprises the first target quantity.

13. The method according to claim 9, wherein the method further comprises: receiving, by the fourth device, a data stream of second service data, wherein the data stream of the second service data is sent by the fifth device, the data stream of the second service data comprises a second S/T bit code block, the second S/T bit code block comprises second service frequency information Vm, the second service frequency information Vm is used to indicate an amount of n-bit second service data that is sent by the fifth device within second statistical duration, the sending frequency of the fifth device is used as a reference for the second statistical duration, and m is a positive integer; and recovering, by the fourth device based on the second service frequency information Vm, a clock corresponding to the second service data.

14. The method according to claim 9, wherein $F_{FlexE}$ is the sending frequency of the fifth device.

15. A first device, comprising: a memory, configured to store a program instruction; a communications interface configured to receive and send data; and a processor configured to invoke the program instruction stored in the memory to perform: receive a data stream of a first service data sent by a third device, and parsing out the first service frequency information Yn from a second S/T bit code block of the data stream of the first service data; determine first service frequency information Xn, wherein the first service frequency information Xn is used to indicate an amount of n-bit first service data that is sent by the first device within a first statistical duration, wherein a sending frequency of the first device is used as a reference for the first statistical duration, and wherein n is a positive integer, wherein the first service frequency information Xn is expressed as $Xn=Ag*F_{client}/F_{FlexE}$, wherein A is a frequency coefficient not equal to 1, and wherein $F_{client}$ is a service frequency of the first service data determined based on Yn;

calculating, based on the first service frequency information Yn, the amount of n-bit first service data that is sent within the first statistical duration, to obtain the first service frequency information Xn; and encapsulate the first service frequency information Xn into a first S/T bit code block, inserting the first S/T bit code block into a data stream of the first service data, and sending the data stream of the first service data to a second device, wherein S and T are positive integers.

16. The first device according to claim 15, wherein the first S/T bit code block is an S/T bit code block identified by O code.

17. The first device according to claim 15, wherein the processor is further configured to: determine the first statistical duration based on a rate of the first service data; and wherein the determining the first service frequency information Xn comprises: collecting statistics about the amount of n-bit first service data that is sent within the first statistical duration.

18. The first device according to claim 15, wherein $F_{FlexE}$ is the sending frequency of the first device.

* * * * *

UNITED STATES PATENT AND TRADEMARK OFFICE
CERTIFICATE OF CORRECTION

| | | |
|---|---|---|
| PATENT NO. | : 11,412,074 B2 | |
| APPLICATION NO. | : 16/786507 | |
| DATED | : August 9, 2022 | |
| INVENTOR(S) | : Renlei Wang et al. | |

It is certified that error appears in the above-identified patent and that said Letters Patent is hereby corrected as shown below:

In the Claims

In Claim 9, Column 26, Line 4, "Zn= Ag*F clien/F FlexE," should be --$Zn = A \cdot F_{client} / F_{FlexE}$--.

In Claim 9, Column 26, Line 5-8, "and wherein F *client* is a service frequency of the first service data; determining the service frequency of the first service data based on the first service frequency information Zn;" should be --and wherein $F_{client}$ is a service frequency of the first service data;--.

In Claim 9, Column 26, Line 9-12, "and recovering, by the fourth device using the service frequency of the first service data, a clock corresponding to the first service data using the first service frequency information of the first service data." should be --and recovering, by the fourth device based on the first service frequency information Zn, a clock corresponding to the first service data.--.

In Claim 15, Column 26, Line 61, "Xn= Ag*F clien/F FlexE," should be --$Xn = A \cdot F_{client} / F_{FlexE}$--.

In Claim 15, Column 26, Line 62-64, "and wherein F *client* is a service frequency of the first service data determined based on Yn;" should be --and wherein $F_{client}$ is a service frequency of the first service data;--.

In Claim 15, Column 26, Line 65-66, "calculating, based on the first service frequency information Yn," should be --calculate, based on the first service frequency information Yn,--.

In Claim 15, Column 27, Line 3-4, "inserting the first S/T bit code block into a data stream of the first service data," should be --inserting the first S/T bit code block into the data stream of the first service data,--.

Signed and Sealed this
Sixth Day of December, 2022

Katherine Kelly Vidal
*Director of the United States Patent and Trademark Office*